US008799440B2

(12) United States Patent
Zhou et al.

(10) Patent No.: US 8,799,440 B2
(45) Date of Patent: Aug. 5, 2014

(54) POLICY AND CHARGING CONTROL METHOD AND SYSTEM FOR MULTI-PDN CONNECTIONS OF SINGLE APN

(75) Inventors: Xiaoyun Zhou, Guangdong Province (CN); Zaifeng Zong, Guangdong Province (CN); Tong Rui, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 102 days.

(21) Appl. No.: 13/257,900

(22) PCT Filed: Dec. 2, 2009

(86) PCT No.: PCT/CN2009/075270
§ 371 (c)(1),
(2), (4) Date: Dec. 19, 2011

(87) PCT Pub. No.: WO2010/145124
PCT Pub. Date: Dec. 23, 2010

(65) Prior Publication Data
US 2012/0102174 A1    Apr. 26, 2012

(30) Foreign Application Priority Data
Jun. 19, 2009 (CN) .......................... 2009 1 0087378

(51) Int. Cl.
*G06F 15/173* (2006.01)
*H04L 12/14* (2006.01)
*H04L 29/08* (2006.01)
*H04W 4/24* (2009.01)
*H04M 15/00* (2006.01)

(52) U.S. Cl.
CPC ............ *H04L 12/14* (2013.01); *H04L 12/1403* (2013.01); *H04L 67/14* (2013.01); *H04W 4/24* (2013.01); *H04M 15/00* (2013.01); *H04M 15/8038* (2013.01); *H04M 15/80* (2013.01); *H04M 15/66* (2013.01)
USPC ........................................................ 709/223

(58) Field of Classification Search
CPC ..................... H04L 41/0213; H04L 29/08072; H04L 29/06; H04L 41/22; H04L 41/12; H04M 11/00; G06F 15/16; H04W 4/00
USPC ........................................................ 709/223
See application file for complete search history.

(56) References Cited

U.S. PATENT DOCUMENTS

| | | | | |
|---|---|---|---|---|
| 8,046,442 B2 * | 10/2011 | Barth et al. | ................... | 709/220 |
| 8,285,861 B2 * | 10/2012 | Hu et al. | ....................... | 709/228 |
| 8,326,263 B2 * | 12/2012 | Zhou et al. | ..................... | 455/408 |
| 2004/0116117 A1 * | 6/2004 | Ahvonen et al. | ........... | 455/432.3 |
| 2009/0182883 A1 * | 7/2009 | Giaretta et al. | ............... | 709/228 |
| 2009/0305684 A1 * | 12/2009 | Jones et al. | .................... | 455/418 |
| 2010/0291923 A1 * | 11/2010 | Zhou et al. | .................... | 455/432.1 |
| 2010/0311392 A1 * | 12/2010 | Stenfelt et al. | ................ | 455/411 |
| 2011/0110300 A1 * | 5/2011 | Sachs et al. | .................... | 370/328 |
| 2011/0138005 A1 * | 6/2011 | Zhou et al. | ..................... | 709/206 |
| 2011/0161504 A1 * | 6/2011 | Zhou et al. | ..................... | 709/227 |
| 2011/0173332 A1 * | 7/2011 | Li et al. | ......................... | 709/227 |
| 2011/0286384 A1 * | 11/2011 | Sugimoto et al. | ............. | 370/328 |
| 2012/0005356 A1 * | 1/2012 | Hellgren | ....................... | 709/229 |
| 2012/0059942 A1 * | 3/2012 | Hu et al. | ....................... | 709/227 |
| 2012/0102174 A1 * | 4/2012 | Zhou et al. | ..................... | 709/223 |
| 2012/0110193 A1 * | 5/2012 | Zhou et al. | ..................... | 709/227 |
| 2012/0117251 A1 * | 5/2012 | Zhou et al. | ..................... | 709/227 |
| 2012/0124220 A1 * | 5/2012 | Zhou et al. | ..................... | 709/227 |
| 2012/0158977 A1 * | 6/2012 | Zhou et al. | ..................... | 709/228 |

FOREIGN PATENT DOCUMENTS

| | | | | |
|---|---|---|---|---|
| CN | 200810216273 | * | 9/2008 | ............. G06F 15/16 |
| CN | 101286915 A | | 10/2008 | |
| CN | 101459951 A | | 6/2009 | |
| WO | WO 2009149775 A1 | * | 12/2009 | ............ H04W 12/08 |

OTHER PUBLICATIONS

Balbas et al. "Policy and Charging Control in the Evolved Packet System", IEEE Communications Magazine, Feb. 2009.*
ETSI, Digital cellular telecommunications system (Phase 2+); Universal Mobile Telecommunications System (UMTS); LTE; Policy and Charging Control (PCC) over S9 reference point (3GPP TS 29.215 version 8.1.0 Release 8), Apr. 2009, ETSI, TS 129 215 V8.1.0.*

International Search Report for PCT/CN2009/075270 dated Mar. 15, 2010.

* cited by examiner

*Primary Examiner* — Eleni Shiferaw
*Assistant Examiner* — Nelson Giddins
(74) *Attorney, Agent, or Firm* — Ling Wu; Stephen Yang; Ling and Yang Intellectual Property LLC

(57) ABSTRACT

A method and a system for performing policy and charging control for establishing multiple packet data network (PDN) connections to a single access point name (APN) are provided. The method associates the gateway control session with the subsession in the S9 session associated with the Gx session modified by the indication of Internet Protocol connectivity access network (IP-CAN) session modification message through the PDN Connection Identifier (ID), thereby, after the relocation occurs on the bearer binding and event report function (BBERF), making the modified policy and charging control (PCC) rule be sent down to the policy and charging enforcement function (PCEF) through the associated Gx session and the modified quality of service (QoS) be sent down to the destination BBERF through the gateway control session, thereby implementing the policy and charging control when establishing multiple PDN connections to the single APN in the roaming scenario.

17 Claims, 13 Drawing Sheets

POLICY AND CHARGING CONTROL METHOD AND SYSTEM FOR MULTI-PDN CONNECTIONS OF SINGLE APN

TECHNICAL FIELD

The present invention relates to the communication field, and particularly, to a method and a system for performing policy and charging control on establishing multiple Packet Data Networks (PDN) connections to single Access Point Name (APN).

BACKGROUND OF THE RELATED ART

An Evolved Packet System (EPS) of the 3rd Generation Partnership Project (3GPP) is composed of an Evolved Universal Terrestrial Radio Access Network (E-UTRAN), a Mobility Management Entity (MME), a Serving Gateway (S-GW), a Packet Data Network Gateway (P-GW), a Home Subscriber Server (HSS), a 3GPP Authentication Authorization Account (AAA) server, a Policy and Charging Rules Function (PCRF) and other supporting nodes.

FIG. 1 is a schematic diagram of a system architecture of EPS according to the related art. As shown in FIG. 1, the MME is responsible for the related work of a control plane, such as a mobility management, a processing of non access stratum signalings and a management of the user mobile management context, and so on; the S-GW is an access gateway device connected with the E-UTRAN, forwards data between the E-UTRAN and the P-GW, and is responsible for buffering paging waiting data; and the P-GW is a border gateway of the EPS and the Packet Data Network (PDN), and is responsible for functions such as the access of the PDN and forwarding data between the EPS and the PDN and so on;

the EPS supports the intercommunication with a non 3GPP network, and implements the intercommunication with the non 3GPP network through S2a/b/c interfaces. The non 3GPP network includes the trusted non 3GPP network and the un-trusted non 3GPP network. The IP access of the trusted non 3GPP network can interface with the P-GW directly through the S2a; and the IP access of the un-trusted non 3GPP network is required to connect with the P-GW through an Evolved Packet Data Gateway (ePDG), and the interface between the ePDG and the P-GW is the S2b.

If the EPS system supports a Policy and Charging Control (PCC), then the PCRF makes the policy and charging rule, and it connects with the Internet Protocol (IP) service network of an operator through a receiving interface Rx and obtains the service information, besides the PCRF connects with the gateway devices in the network through Gx/Gxa/Gxc interfaces, and is responsible for initiating the establishment of IP bearer, ensuring the Quality of Service (QoS) of the service data, and performing the charging control, wherein a Policy and Charging Enforcement Function (PCEF) is located in the P-GW, the PCRF and the P-GW exchange information through the Gx interface. When the interface between the P-GW and the S-GW is based on the Proxy Mobile IP (PMIP), Bearer Binding and Event Report Function (BBERF) exists in the S-GW, and the S-GW and the PCRF exchange information through the Gxc interface. When the trusted non 3GPP network is accessed, the BBERF also resides in an access gateway of the trusted non 3GPP network, and the access gateway of the trusted non 3GPP network and the PCRF exchange information through the Gxa interface. When the User Equipment (UE) is roaming, the interface of the home PCRF and the visited PCRF is a S9 interface, and at the same time, the Application Function (AF) providing services for UE is located in the service network, and sends service information for generating the PCC policy to the PCRF through the Rx interface.

In the present techniques, the protocol used in the PCC architecture is a Diameter application protocol developed based on a Diameter Base Protocol, for example the application protocol applied in the Gx interface, the application protocol applied in the Rx interface, the application protocol of the Gxx interface (including the Gxa and the Gxc interfaces) and the application protocol applied in the roaming interface S9 and so on. These application protocols define the messages, commands and Attribute Value Pairs (AVP) for the PCC and so on. The Diameter sessions established by these protocols can be respectively called as Gx session, Gxx session (gateway control session), Rx session and S9 session. Various function entities of the PCC perform the policy and charging control through these sessions on the UE access network establishing the PDN connections.

The EPS system supports the Multiple PDN access, that is, the UE can access a plurality of PDNs at the same time through a plurality of P-GWs or one P-GW, and the EPS supports that the UE can access the same one PDN many times at the same time. In the 3GPP, the corresponding PDN network can be found through the Access Point Name (APN, which also can be called as the PND identification). Therefore, it can be considered that the UE can access the same one APN many times at the same time. Generally, one connection from the UE to the PDN network is called as one IP Connectivity Access Network (IP-CAN) session, and thus the EPS supports that the UE can have a plurality of IP-CAN sessions with one PDN network at the same time.

FIG. 2 is a flow chart of the UE accessing the same one APN twice through the trusted non 3GPP access network according to the related art in a non roaming scenario in the prior art, and specific steps are as follows:

step S201, the UE accesses the trusted non 3GPP access network;

step S202, the UE makes a request for performing a EPS access authentication to the HSS/AAA after accessing the trusted non 3GPP access network; the HSS/AAA authenticates the UE which sends the request after receiving the EPS access authentication request; and the HSS/AAA sends P-GW selection information subscribed by the user and the APN subscribed by the user, including a default APN, to the trusted non 3GPP access gateway after completing the authentication on the UE, and below the "APN" denotes the "default APN" in the case that there is no ambiguity;

step S203, a layer 3 attachment flow is triggered after the authentication succeeding;

step S204, the trusted non 3GPP access gateway supports to establish multiple PDN connections regarding to a single APN, and the trusted non 3GPP access gateway allocates a packet data network connection identifier1 (PDN Connection Id1) for uniquely differentiating the PDN connection to be established. The BBERF residing in the trusted non 3GPP access gateway sends a gateway control session establishment request message to the PCRF, and a user identifier NAI (Network Access Identifier), a PDN identifier APN and the PDN Connection Id1 are carried in the gateway control session establishment request message. This message makes a request for establishing one gateway control session (i.e., the Gxx session), and the identifier is Gxx session1;

step S205, the PCRF makes the PCC rule and QoS rule according to user subscription data, a network policy, and a bearer attribute and so on, and at the same time, the PCRF may also make a corresponding event trigger; the PCRF sends the QoS rule and the event trigger to the trusted non 3GPP access gateway through a "gateway control session establishment acknowledge" message; the trusted non 3GPP access gateway installs the QoS rule and the event trigger. These rules are not policies regarding to the specific services, but are some default policies;

step S206, the trusted non 3GPP access gateway selects the P-GW according to P-GW selection information after receiving the P-GW selection information, and sends a proxy binding update message to the selected P-GW, wherein the user identifier NAI, the PDN identifier APN and the PDN Connection Id1 are carried in the message;

step S207, the P-GW allocates a IP address, IP Address1, of the PDN connection to be established for the UE. The PCEF residing in the P-GW sends an indication of IP-CAN session establishment to the PCRF, and the user identifier NAI, the IP Address1, the PDN identifier APN and the PDN Connection Id1 are carried in the indication of IP-CAN session establishment. This message makes a request for establishing one Gx session, and the identifier is Gx session1;

step S208, the PCRF associates the indication of IP-CAN session establishment message with the previous gateway control session establishment request message according to the user identifier NAI, the PDN identifier APN and the PDN Connection Id1 after receiving the indication of IP-CAN session establishment, that is, associates the gateway control session (Gxx session1) established in step S204 with the IP-CAN session (Gx session1) established in step S207. At the same time, the user subscription information is inquired, the previously made rules are updated according to the user subscription information, the network policy and the bearer attribute and so on, and the PCRF sends a IP-CAN session establishment acknowledge message to the PCEF in the P-GW, wherein the PCC rule is carried in that IP-CAN session establishment acknowledge message. These rules are not the policies regarding to the specific services, but are some default policies;

step S209, the PCEF which is located in the P-GW installs and enforces the PCC rule carried in the IP-CAN session establishment acknowledge message after receiving the IP-CAN session establishment acknowledge message, and at the same time, the P-GW sends its own IP address to the HSS;

step S210, the P-GW returns a proxy binding acknowledge message to the trusted non 3GPP access gateway, and the proxy binding acknowledge message includes the IP address, IP Address1, allocated by the P-GW for the PDN connection established by the UE;

step S211, if the QoS rule made in step S208 is different from that sent down in step S205, then the PCRF sends the updated QoS rule down to the BBERF in the trusted non 3GPP access gateway through the gateway control and QoS policy rule provision message;

step S212, the BBERF in the trusted non 3GPP access gateway installs the QoS rule, and returns the gateway control and QoS policy rule provision acknowledge;

step S213, the layer 3 attachment is completed;

step S214, a PMIPv6 tunnel is established between the trusted non 3GPP access gateway and the P-GW, and the UE can send or receive data. The UE can access the dedicated services through the established PDN connection, and the PCRF also can make the corresponding policies for resource reservation according to the characteristics of the accessed services. These policies can be considered as the dedicated policies for accessing the services;

step S215, the UE decides to initiate to establish a second PDN connection regarding to the APN, and the UE sends a triggering new PDN connection establishment request message to the trusted non 3GPP access gateway, wherein the PDN identifier APN is carried in the message;

step S216, the trusted non 3GPP access gateway allocates the PDN Connection Id2 for uniquely differentiating the second PDN connection to be established. The BBERF residing in the trusted non 3GPP access gateway sends the gateway control session establishment request message to the PCRF, and the user identifier NAI, the PDN identifier APN and the PDN Connection Id2 are carried in the gateway control session establishment request message. The message makes a request for one gateway control session (Gxx session), and the identifier is Gxx session2;

step S217, the PCRF makes the PCC rule and the QoS rule according to the user subscription data, the network policy, and the bearer attribute and so on, and at the same time, the PCRF may also make the corresponding event trigger; the PCRF sends the QoS rule and the event trigger to the trusted non 3GPP access gateway through the "gateway control session establishment acknowledge" message; and the trusted non 3GPP access gateway installs the QoS rule and the event trigger. These rules are not policies regarding to the specific services, but are some default policies;

step S218, the trusted non 3GPP access gateway sends the proxy binding update message to the selected P-GW, and the user identifier NAI, the PDN identifier APN and the PDN Connection Id2 are carried in the message;

step S219, the P-GW allocates the IP address, IP Address2, of the second PDN connection to be established for the UE. The PCEF residing in the P-GW sends the indication of IP-CAN session establishment to the PCRF, and the user identifier NAI, the IP Address2, the PDN identifier APN and the PDN Connection Id2 are carried in the indication of IP-CAN session establishment. The message makes a request for establishing one Gx session, and the identifier is Gx session2;

step S220, the PCRF associates the indication of LP-CAN session establishment message with the previous gateway control session establishment request message according to the user identifier NAI, the PDN identifier APN and the PDN Connection Id2 after receiving the indication of IP-CAN session establishment, that is, associates the gateway control session (Gxx session2) established in step S216 with the IP-CAN session (Gx session2) established in step S219. At the same time, the user subscription information is inquired, the previously made rules are updated according to the user subscription information, the network policy and the bearer attribute and so on, and the PCRF sends the IP-CAN session establishment acknowledge message to the PCEF in the P-GW, wherein the PCC rule is carried in the IP-CAN session establishment acknowledge message. These rules are not the policies regarding to the specific services, but are some default policies;

step S221, the PCEF in the P-GW installs and enforces the PCC rule carried in the IP-CAN session establishment acknowledge message after receiving the IP-CAN session establishment acknowledge message, and at the same time, the P-GW sends its own IP address to the HSS;

step S222, the P-GW returns the proxy binding acknowledge message to the trusted non 3GPP access gateway, and the proxy binding acknowledge message includes the IP address, IP Address2, allocated by the P-GW for the second PDN connection established by the UE;

step S223, if the QoS rule made in step S220 is different from that sent down in step S217, then the PCRF sends the updated QoS rule down to the trusted non 3GPP access gateway through the gateway control and QoS policy rule provision message;

step S224, the trusted non 3GPP access gateway installs the QoS rule, and returns the gateway control and QoS policy rule provision acknowledge;

step S225, the trusted non 3GPP access gateway returns a reply message carrying the IP Address2 to the UE;

step S226, a second PMIPv6 tunnel is established between the trusted non 3GPP access gateway and the P-GW, and the UE can send or receive data. The UE will use the second established PDN connection to access some dedicated services in subsequent flows, and the PCRF will make the corresponding policies for the resource reservation according to the characteristics of the services. These policies can be considered as the dedicated policies for accessing the services.

It can be seen from the above flow that, in order to support to establish multiple PDN connections regarding to the single APN, the trusted non 3GPP access gateway should allocate one PDN Connection Id for each PDN connection with the same APN for uniquely differentiating each PDN connection accessing the same APN. The PCRF associates the gateway control session (Gxx session) with the IP-CAN session (Gx session) according to the user identifier NAI, the PDN identifier APN and the PDN Connection Id.

The similar establishment flow can similarly be used for accessing by the UE through the E-UTRAN, and the PMIPv6 protocol is adopted between the S-GW and P-GW. The difference is that the PDN Connection Id is a bearer identifier of a default bearer of the PDN connection allocated by the MME.

FIG. 3 is a flow chart of a handover across the systems (namely, the handover from one non 3GPP system to another non 3GPP system) occurring after the UE establishes two PDN connections to the default APN according to the flow of FIG. 2 in the non roaming scenario in the prior art. Before the flow in FIG. 3 starting, it is assumed that the UE accesses through the trusted non 3GPP access network1 and establishes two PDN connections regarding to the APN, and the UE accesses its own dedicated services through the two PDN connections respectively. The PCRF respectively makes the dedicated PCC rule and QoS rule for own dedicated services for the resource reservation of the bearer layer. The specific steps are as follows:

step S301, the UE detects a trusted non 3GPP access network2, and decides to initiate the handover;

step S302, the UE makes a request for performing the EPS access authentication to the HSS/AAA after accessing the trusted non 3GPP access network2; the HSS/AAA authenticates the UE which sends the request after receiving the EPS access authentication request; and the HSS/AAA sends the IP address of the P-GW selected by the UE through the access network1 and the user subscribed APN, including the default APN, to the trusted non 3GPP access gateway2 after completing the authentication on the UE;

step S303, a layer 3 attachment flow is triggered after the authentication succeeding;

step S304, the trusted non 3GPP access gateway2 supports to establish multiple PDN connections regarding to the single APN, and the trusted non 3GPP access gateway2 allocates a PDN Connection Id3 for uniquely differentiating the PDN connection to be re-established. The BBERF residing in the trusted non 3GPP access gateway2 sends the gateway control session establishment request message to the PCRF, wherein the user identifier NAI, the PDN identifier APN and the PDN Connection Id3 are carried in the gateway control session establishment request message. The message makes a request for establishing one gateway control session (Gxx session), and the identifier is Gxx session3;

since there is no information exchange between the trusted non 3GPP access gateway1 and the trusted non 3GPP access gateway2, the respective allocated PDN Connection Ids are different.

Step S305, the PCRF judges that handover of the UE occurs, and finds the information before the user hands over according to the user identifier NAI and the PDN identifier APN. However, since the PDN Connection Id3 is a new identifier, the PCRF is unable to judge which PDN connection before the handover should be associated with the PDN Connection Id3 (that is, which IP-CAN session (Gx session) before the handover is associated), thus the PCRF is unable to send down the dedicated policy related to a certain dedicated service accessed by the UE before the handover. The PCRF is only able to make the QoS rule according to information such as the user subscription, the network policy and a new access bearer attribute and so on, and sends these default QoS rule and event trigger to the BBERF in the trusted non 3GPP access gateway2 through the "gateway control session establishment acknowledge" message. The BBERF located in the trusted non 3GPP access gateway2 installs the QoS rule and the event trigger;

step S306, the trusted non 3GPP access gateway2 sends the proxy binding update message to the P-GW, wherein the user identifier NAI, the PDN identifier APN and the PDN Connection Id3 are carried in the message; and step S306 can perform sending just after receiving the message of step S304 instead of waiting for the response of step S305;

step S307, the P-GW in which the PCEF resides selects one PDN connection from the PDN connections established by the source system to perform the re-establishment after receiving the proxy binding update message; and it is assumed that the P-GW decides to firstly re-establish the first PDN connection established in the source system for the UE, then the PCEF sends an indication of IP-CAN session modification message (in which the message modifies the first IP-CAN session, i.e., the Gx session1, established by the source system) to the PCRF; and the indication of IP-CAN session modification includes the PDN Connection Id3, and the message can also include the user identifier NAI, the PDN identifier APN and the IP Address1;

step S308, the PCRF associates the gateway control session establishment message of step S304 with the indication of IP-CAN session modification according to the user identifier NAI, the PDN identifier APN and the PDN Connection Id3 after receiving the indication of IP-CAN session modification, that is, associates the new gateway control session (Gxx session3) with the first IP-CAN session (Gx session 1) established in the source system. The PCRF is likely to modify the PCC rule, QoS rule and event trigger (including the default rules and the dedicated rules) of the first PDN connection established before the UE hands over according to information such as the new access network bearer attribute and so on, and send the updated PCC rule and event trigger to the PCEF in the P-GW through the IP-CAN session modification acknowledge message. The PCEF installs and enforces the PCC rule and the event trigger after receiving the IP-CAN session modification acknowledge message;

step S309, the P-GW returns the proxy binding acknowledge message carrying the IP Address1 to the trusted non 3GPP access gateway2;

step S310, the PCRF sends the QoS rule and event trigger updated in step S308 down to the BBERF of the trusted non 3GPP access gateway2 through the gateway control and QoS policy rule provision message;

step S311, the BBERF located in the trusted non 3GPP access gateway2 installs the QoS rule, and returns the gateway control and QoS policy rule provision acknowledge message;

step S312, the layer 3 attachment is completed;

step S313, the PMIPv6 tunnel is established between the trusted non 3GPP access gateway2 and the P-GW, and the UE re-establishes the first PDN connection from the source system to the default APN. The UE can access the dedicated services which have been applied for being accessed in the source system through the PDN connection;

step S314, the UE sends a triggering indication message to the trusted non 3GPP access gateway2, wherein the APN and a handover indication are carried in the triggering indication message, and the handover indication is used for indicating to re-establish one PDN connection before the handover to the trusted non 3GPP access gateway2;

step S315, the trusted non 3GPP access gateway2 in which the BBERF resides allocates a PDN Connection Id4 for uniquely differentiating the PDN connection to be re-established. The BBERF sends the gateway control session establishment request message to the PCRF, wherein the user identifier NAI, the PDN identifier APN and the PDN Connection Id4 are carried in the gateway control session establishment request message. The message makes a request for establishing one gateway control session (i.e., the Gxx session), and the identifier is Gxx session4;

step S316, the PCRF finds the information before the user hands over according to the user identifier NAI and the PDN identifier APN. However, since the PDN Connection Id4 is a new identifier, the PCRF is unable to bind the PDN Connection Id4 on a certain PDN connection before the handover, thus the PCRF is unable to send down the dedicated policy related to the dedicated service accessed by the UE before the handover. The PCRF is only able to make the QoS rule and the event trigger according to the user subscription, the network policy and the bearer attribute of the current access network, and send these default QoS rule and event trigger to the BBERF in the trusted non 3GPP access gateway2 through the gateway control session establishment acknowledge message. The BBERF in the trusted non 3GPP access gateway2 installs the QoS rule and the event trigger;

step S317, the trusted non 3GPP access gateway2 sends the proxy binding update request message to the P-GW, wherein the user identifier NAI, the PDN identifier APN and the PDN Connection Id4 are carried in the request message; and step S317 can perform sending just after receiving the message of step S314 instead of waiting for the response of step S316;

step S318, the P-GW in which the PCEF resides selects one PDN from the PDN connections established by the source system to perform the re-establishment after receiving the proxy binding update message, since only the second PDN connection established by the source system is left, the P-GW decides to re-establish the second PDN connection established in the source system for the UE, then the PCEF sends the indication of IP-CAN session modification message (in which the message modifies the second IP-CAN session established by the source system, i.e., the Gx session2) to the PCRF; and the indication of IP-CAN session modification includes the PDN Connection Id4, and the message can further include the user identifier NAI, the PDN identifier APN and the IP Address2;

step S319, the PCRF associates the gateway control session establishment message of step S315 with the indication of IP-CAN session modification according to the user identifier NAI, the PDN identifier APN and the PDN Connection Id4 after receiving the indication of IP-CAN session modification, that is, associates the new gateway control session (Gxx session4) with the second IP-CAN session (Gx session2) established in the source system. The PCRF is likely to modify the PCC rule, QoS rule and event trigger (including the default rules and the dedicated rules) of the second PDN connection established before the UE hands over according to information such as the new bearer attribute of the access network and so on, and send the updated PCC rule and event trigger to the PCEF of the P-GW through the IP-CAN session modification acknowledge message. The PCEF in the P-GW installs and enforces the PCC rule and the event trigger after receiving the IP-CAN session modification acknowledge message;

step S320, the P-GW returns the "proxy binding acknowledge" message to the trusted non 3GPP access gateway2, wherein the IP Address2 is carried in the "proxy binding acknowledge" message;

step S321, the trusted non 3GPP access gateway2 returns the reply message to the UE, wherein the IP Address2 is carried in the reply message;

step S322, the PCRF sends the QoS rule and event trigger updated in step S319 down to the BBERF in the trusted non 3GPP access gateway2 through the gateway control and QoS policy rule provision message;

step S323, the BBERF located in the trusted non 3GPP access gateway2 returns the gateway control and QoS rule provision acknowledge message;

step S324, the PMIPv6 tunnel is also established between the trusted non 3GPP access gateway2 and the P-GW, and the UE re-establishes the second PDN connection from the source system to the default APN. The UE can access the dedicated services which have been applied for being assessed in the source system through the PDN connection.

It can be seen from the above flow that, when the handover of the UE across the systems occurs, since two access gateways are unable to interact, the PDN Connection Ids allocated respectively for supporting establishing multiple PDN connections to one APN are different. Therefore, when the PCRF receives the gateway control session establishment request message sent by the destination BBERF, the PCRF is unable to immediately associate it with a certain PDN connection (the IP-CAN session, i.e., the Gx session) established in the source system. The PCRF has to wait for the P-GW making the selection, and makes the association according to the PDN Connection Id carried in the indication of IP-CAN session modification message.

However, in the prior art, it only discusses the method for performing the policy and charging control for establishing multiple PDN connections regarding to one APN in the non roaming scenario. For the roaming scenario, the prior art has not related to, and the difficulty exists in performing the policy and charging control for establishing multiple PDN connections to one APN in the roaming scenario due to the complexities of the EPS roaming scenario and of the policy and charging control itself in the roaming scenario.

The EPS has three roaming architectures, the first one is home routed, FIG. 4 is a roaming architecture diagram of the EPS of the home routed according to the prior art, and as shown in FIG. 4, the P-GW is in the home network and the IP services are provided by the home network operator (namely, the AF is in the home network); the second one is the local breakout and the home network operator providing the IP services, FIG. 5 is a roaming architecture diagram of the EPS of the local breakout and the home network operator providing the IP services according to the prior art, and as shown in FIG. 5, the P-GW is in the visited network and the IP services are provided by the home network operator (namely, the AF is in the home network); and the third one is the local breakout and the visited network operator providing the IP services, FIG. 6 is a roaming architecture diagram of the EPS of the local breakout and the visited network operator providing the IP services according to the prior art, and as shown in FIG. 6, the P-GW is in the visited network and the IP services are provided by the visited network operator (namely, the AF is in the visited network). For different roaming scenarios, the flows of the PCC are different, and the functions enforced by the PCC network element are also different.

At present, the scheme of implementing the S9 roaming interface is that the Visited PCRF (vPCRF) terminates Gx sessions and gateway control sessions (Gxx sessions), existing in the visited network, of all the IP-CAN sessions established by the UE, that is, the Gxx sessions and the Gx sessions will not be sent to the Home PCRF (hPCRF), but one S9 session is established between the vPCRF and the hPCRF, and that S9 session is used to transmit the information on the Gx sessions and the Gxx sessions of all the IP-CAN sessions; however, the Rx sessions, in the visited network, of all the IP-CAN sessions will not be terminated, the messages of the Rx sessions are only forwarded to the home PCRF, and the vPCRF is taken as one Proxy. A plurality of subsessions (which are called as S9 Subsessions) possibly exists in one S9 session. Each Subsession is used for transmitting information on the Gx and Gxx sessions of one IP-CAN session.

SUMMARY OF THE INVENTION

In view of this, the main object of the present invention is to provide a method and a system for performing policy and charging control for establishing multiple PDN connections to a single APN in a roaming scenario, which are used for solving the technical problem of performing policy and charging control for the case of establishing multiple PDN connections to the single APN in a roaming scenario. In order to achieve the above object, the technical scheme of the present invention is implemented in the way that:

the present invention provides a method for performing policy and charging control for establishing multiple PDN connections to a single APN, which comprises steps of:

when relocation occurs on a bearer binding and event report function (BBERF), a destination BBERF sending a gateway control session establishment request message to a visited policy and charging rule function (PCRF) so as to make a request for establishing a gateway control session, wherein a packet data network connection identifier (PDN Connection ID) is carried in said gateway control session establishment request message; and said visited PCRF, according to said PDN Connection ID, associating the gateway control session with a subsession of a S9 session associated with a Gx session modified by an indication of Internet protocol connectivity network (IP-CAN) session modification message.

Furthermore, in a home routed roaming scenario, a policy and charging enforcement function (PCEF) is located in a home network.

Furthermore, based on the above home routed roaming scenario, the step of said visited PCRF associating the gateway control session with the subsession of the S9 session associated with the Gx session modified by the indication of IP-CAN session modification message comprises:

a destination access gateway where said destination BBERF is located sending a proxy binding update message to a packet data network gateway (P-GW) where a PCEF is located, wherein said PDN Connection ID is carried in said proxy binding update message;

said P-GW selecting a re-established PDN connection after receiving said proxy binding update message, said home PCEF sending the indication of IP-CAN session modification message to said home PCRF, wherein said PDN Connection ID is carried in said indication of IP-CAN session modification message;

said home PCRF sending the S9 session and rule provision message to said visited PCRF after receiving said indication of IP-CAN session modification message, and said PDN Connection ID is carried in the subsession of the S9 session associated with the Gx session modified by said indication of IP-CAN session modification message; and said visited PCRF associating said gateway control session with said subsession of the S9 session according to said PDN Connection ID after receiving said S9 session and rule provision message.

Furthermore, based on the above home routed roaming scenario, said method further comprises:

said home PCRF sending a policy and charging control (PCC) rule of a PDN connection which is selected and re-established by said home P-GW to said home PCEF through the Gx session modified by said indication of IP-CAN session modification message after modifying according to a new access network bearer attribute, and said home PCEF installing and enforcing the modified PCC rule; and after said home PCRF modifies a quality of service (QoS) rule of the PDN connection which is selected and re-established by said home P-GW according to the new access network bearer attribute, said home PCRF sending the modified QoS rule to said visited PCRF through said subsession of the S9 session, said visited PCRF sending the modified QoS rule to said destination BBERF through said gateway control session established by said gateway control session establishment request message, and said destination BBERF installing and enforcing the modified QoS rule.

Furthermore, in a local breakout roaming scenario, a policy and charging enforcement function (PCEF) is located in a visited network, wherein a visited PCEF sends the indication of IP-CAN session modification message to said visited PCRF, and said PDN Connection ID is carried in said indication of IP-CAN session modification message.

Furthermore, based on the above local breakout roaming scenario, the step of said visited PCRF associating the gateway control session with the subsession of the S9 session associated with the Gx session modified by the indication of IP-CAN session modification message comprises:

said visited PCRF associating the gateway control session with said Gx session modified by said indication of IP-CAN session modification message according to said PDN Connection ID; and said visited PCRF associating said gateway control session with the subsession of the S9 session associated with said Gx session.

Furthermore, based on the above local breakout roaming scenario, before the step of said visited PCRF associating the gateway control session with said Gx session modified by the indication of IP-CAN session modification message according to said PDN Connection ID, said method further comprises:

a destination access gateway where said destination BBERF is located sending a proxy binding update message to a visited P-GW where said visited PCEF is located, wherein said PDN Connection ID is carried in said proxy binding update message; and said visited P-GW selecting a re-established PDN connection after receiving said proxy binding update message, and further said visited PCEF sending the indication of IP-CAN session modification message to said visited PCRF, wherein said PDN Connection ID is carried in said indication of IP-CAN session modification message.

Furthermore, based on the above local breakout roaming scenario, said method further comprises:

said home PCRF sending a policy and charging control (PCC) rule and a quality of service (QoS) rule of a PDN connection which is selected by said visited P-GW to said visited PCRF after modifying according to a new access network bearer attribute;

said visited PCRF sending said PCC rule to said visited PCEF through the Gx session modified by said indication of IP-CAN session modification message, and said visited PCEF installing and enforcing said PCC rule; and said visited PCRF sending said QoS rule to said destination BBERF through said gateway control session established by said gateway control session establishment request message, and said destination BBERF installing and enforcing said QoS rule.

Furthermore, based on the above scheme, after the step of said destination BBERF sending the gateway control session establishment request message to the visited PCRF, said method further comprises:

said visited PCRF sending an indication of S9 session modification message to a home PCRF so as to notify said home PCRF of handover occurring on a user equipment, and said home PCRF sending a default policy to said visited PCRF.

Furthermore, based on the above scheme, said destination access gateway is a serving gateway (S-GW) or a trusted non 3rd generation partnership project (3GPP) access gateway.

The present invention further proposes a system for performing policy and charging control for establishing multiple packet data network (PDN) connections to single access point name (APN), comprising: a destination bearer binding and event report function (BBERF), a policy and charging enforcement function (PCEF), a visited policy and charging rule function (PCRF) and a home PCRF; wherein:

said destination BBERF is configured to: send a gateway control session establishment request message to the visited PCRF so as to make a request for establishing a gateway control session, wherein a packet data network connection identifier (PDN Connection ID) is carried in said gateway control session establishment request message;

said visited PCRF is configured to: associate the gateway control session with a subsession of a S9 session associated with a Gx session modified by an indication of internet protocol connectivity network (IP-CAN) session modification message according to said PDN Connection ID.

Furthermore, in a home routed roaming scenario, said Policy and Charging Enforcement Function (PCEF) is located in a home network, said PCEF is configured to:
send the indication of IP-CAN session modification message to said home PCRF, wherein said PDN Connection ID is carried in said indication of IP-CAN session modification message; and install and enforce a policy and charging control (PCC) rule sent by said home network;

said home PCRF is configured to:
after receiving said indication of IP-CAN session modification message sent by said PCEF, send the S9 session and rule provision message to said visited PCRF, and said PDN Connection ID is carried in the subsession of the S9 session associated with the Gx session modified by said indication of IP-CAN session modification message;

after modifying said PCC rule of a PDN connection which is selected and re-established by a home packet data network gateway (P-GW) according to a new access network bearer attribute, send to said PCEF through the Gx session modified by said indication of IP-CAN session modification message; and after modifying a quality of service (QoS) rule of the PDN connection which is selected and re-established by said home P-GW according to the new access network bearer attribute, send to said visited PCRF through said subsession of the S9 session; said visited PCRF is further configured to:

receive said gateway control session establishment request message sent by said destination BBERF;

receive said S9 session and rule provision message sent by said home PCRF; and receive said QoS rule sent by said home PCRF, and send said QoS rule to said destination BBERF through said gateway control session established by said gateway control session establishment request message;

said destination BBERF is further configured to: install and enforce said QoS rule sent by said visited PCRF.

Furthermore, in a local breakout roaming scenario, said Policy and Charging Enforcement Function (PCEF) is located in a visited network, said PCEF is configured to:
send the indication of IP-CAN session modification message to said visited PCRF, wherein said PDN Connection ID is carried in said indication of IP-CAN session modification message; and install and enforce a policy and charging control (PCC) rule sent by said visited PCRF;

said visited PCRF is further configured to:
receive said indication of IP-CAN session modification message sent by said PCEF, and associate the gateway control session which is requested for establishing by said gateway control session establishment request message with said Gx session modified by the indication of IP-CAN session modification message according to said PDN Connection ID carried in said indication of IP-CAN session modification message;

associate said gateway control session with the subsession of the S9 session associated with said Gx session;

receive said PCC rule sent by said home PCRF, and send said PCC rule to said PCEF through said Gx session modified by said indication of IP-CAN session modification message; and receive a quality of service (QoS) rule sent by said home PCRF, and send said QoS rule to said destination BBERF through said gateway control session established by said gateway control session establishment request message;

said home PCRF is configured to:
after modifying said PCC rule and said QoS rule of a PDN connection which is selected by a visited packet data network gateway (P-GW) according to a new access network bearer attribute, send to said visited PCRF;

said destination BBERF is further configured to: install and enforce said QoS rule sent by said visited PCRF.

Furthermore, in the above system, said visited PCRF is further configured to:
send an indication of S9 session modification message to said home PCRF so as to notify said home PCRF of handover occurring on a user equipment; and receive a default policy sent by said home PCRF;

said home PCRF is further configured to:
receive said indication of S9 session modification message sent by said visited PCRF, and send said default policy to said visited PCRF.

The present invention further provides a method for performing policy and charging control for establishing multiple packet data network (PDN) connections to a single access point name (APN), comprising:

in a process of establishing an Internet protocol connectivity network (IP-CAN) session, a bearer binding and event report function (BBERF) sending a gateway control session establishment request message including a packet data network connection identifier (PDN Connection ID) to a visited policy and charging rule function (PCRF) so as to establish a gateway control session;

after receiving said gateway control session establishment request message, said visited PCRF sending an indication of S9 session establishment message or an indication of S9 session modification message to a home PCRF so as to establish a subsession of an S9 session;

a policy and charging enforcement function (PCEF) sending an indication of IP-CAN session establishment message including said PDN Connection ID to said visited PCRF so as to establish a Gx session; and said visited PCRF associating said gateway control session, said Gx session and said subsession of the S9 session according to said PDN Connection ID.

Furthermore, the method further comprises:

after receiving said indication of S9 session establishment message or said indication of S9 session modification message sent by said visited PCRF, said home PCRF including a default policy made for a corresponding user in an S9 session establishment acknowledge message or an S9 session modification acknowledge message to send to said visited PCRF; and after receiving said S9 session establishment acknowledge message or said S9 session modification acknowledge message, said visited PCRF including a quality of service (QoS) rule of said default policy into a gateway control session establishment acknowledge message to send to said BBERF, and including a policy and charging control (PCC) rule of said default policy into an IP-CAN session establishment acknowledge message to send to said PCEF.

The beneficial effects of the present invention are obvious. In the roaming scenario, the present invention associates the gateway control session with the subsession in the S9 session associated with the Gx session modified by the indication of IP-CAN session modification message through the PDN Connection ID, thereby, after the relocation occurs on the BBERF making the modified PCC rule be sent down to the PCEF through the associated Gx session and the modified QoS be sent down to the destination BBERF through the gateway control session, thereby implementing the policy and charging control when establishing multiple PDN connections to single APN is supported in the roaming scenario.

PREFERRED EMBODIMENTS OF THE PRESENT INVENTION

Figure 1:
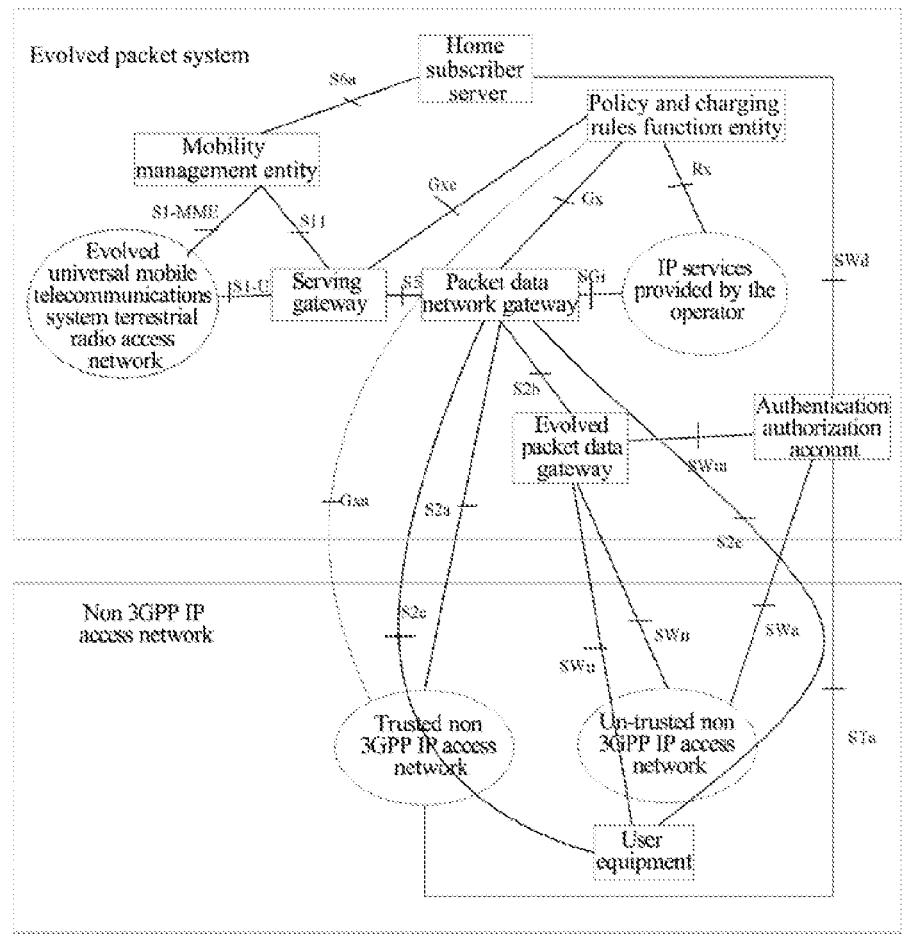
FIG. 1 is a non roaming architecture diagram of the EPS.
Figure 2:
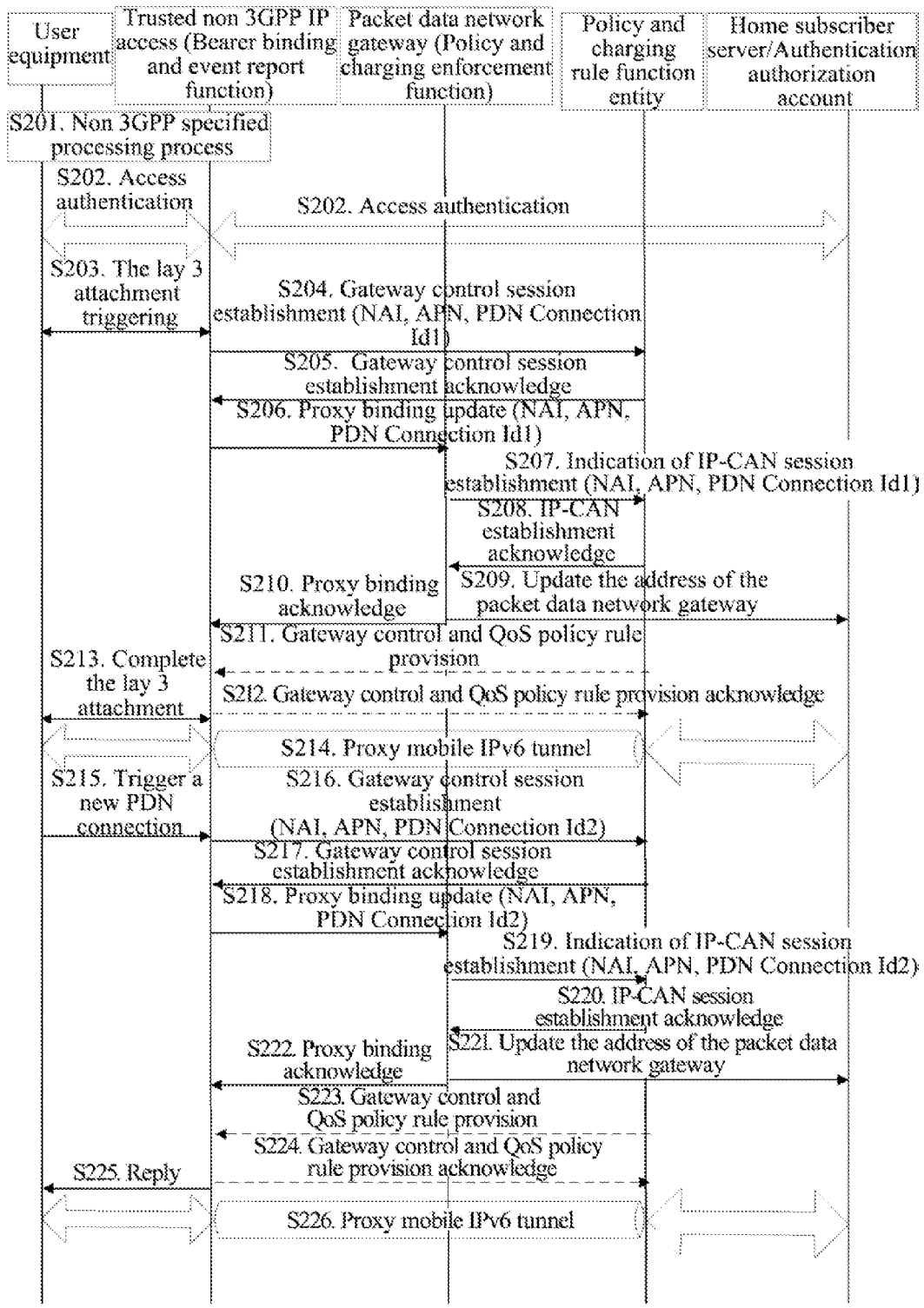
FIG. 2 is a flow chart of establishment of establishing multiple PDN connections to a single APN in a non roaming scenario.
Figure 3:
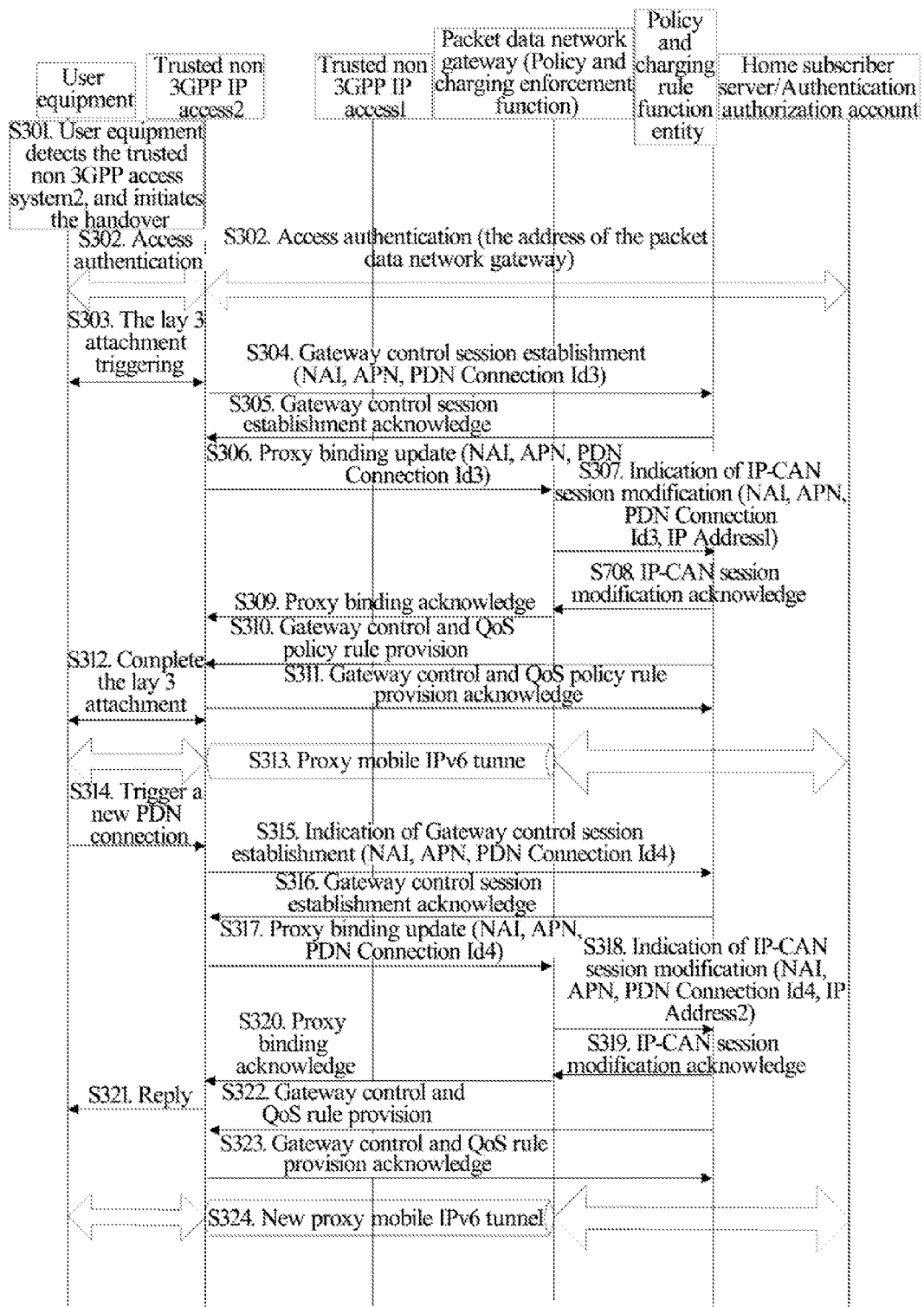
FIG. 3 is a flow chart of handover of establishing multiple PDN connections to a single APN in a non roaming scenario.
Figure 4:
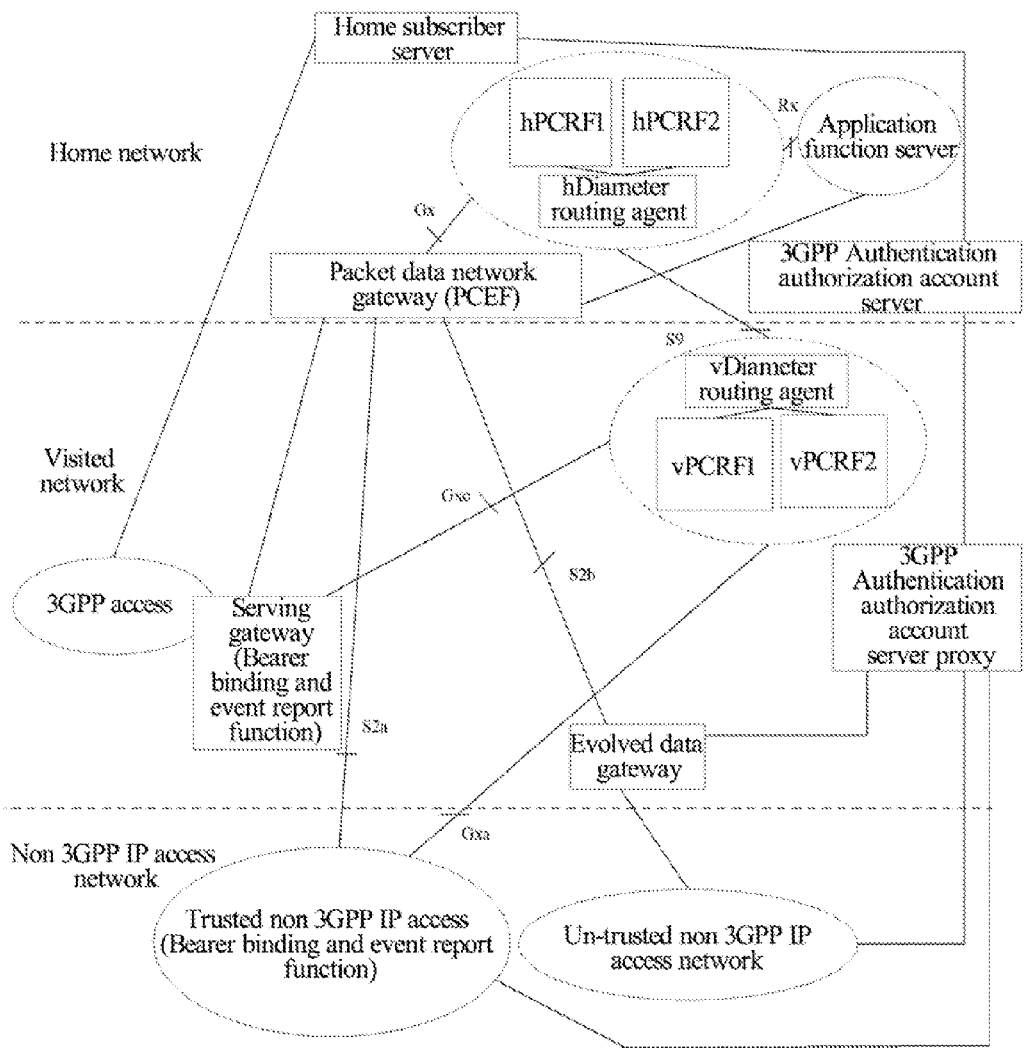
FIG. 4 is a roaming architecture diagram of a home routed EPS.
Figure 5:
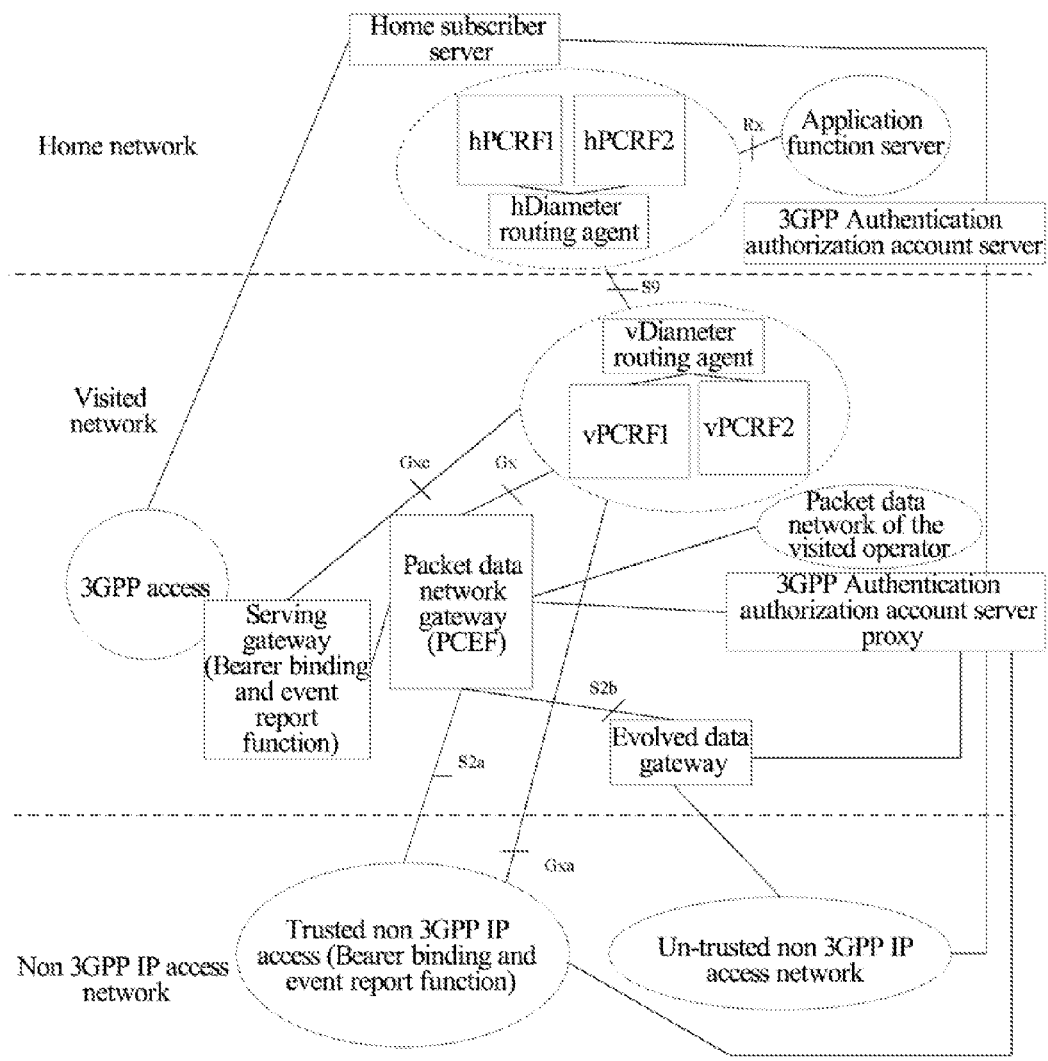
FIG. 5 is a roaming architecture diagram of a EPS of local breakout and home network operator providing IP services.
Figure 6:
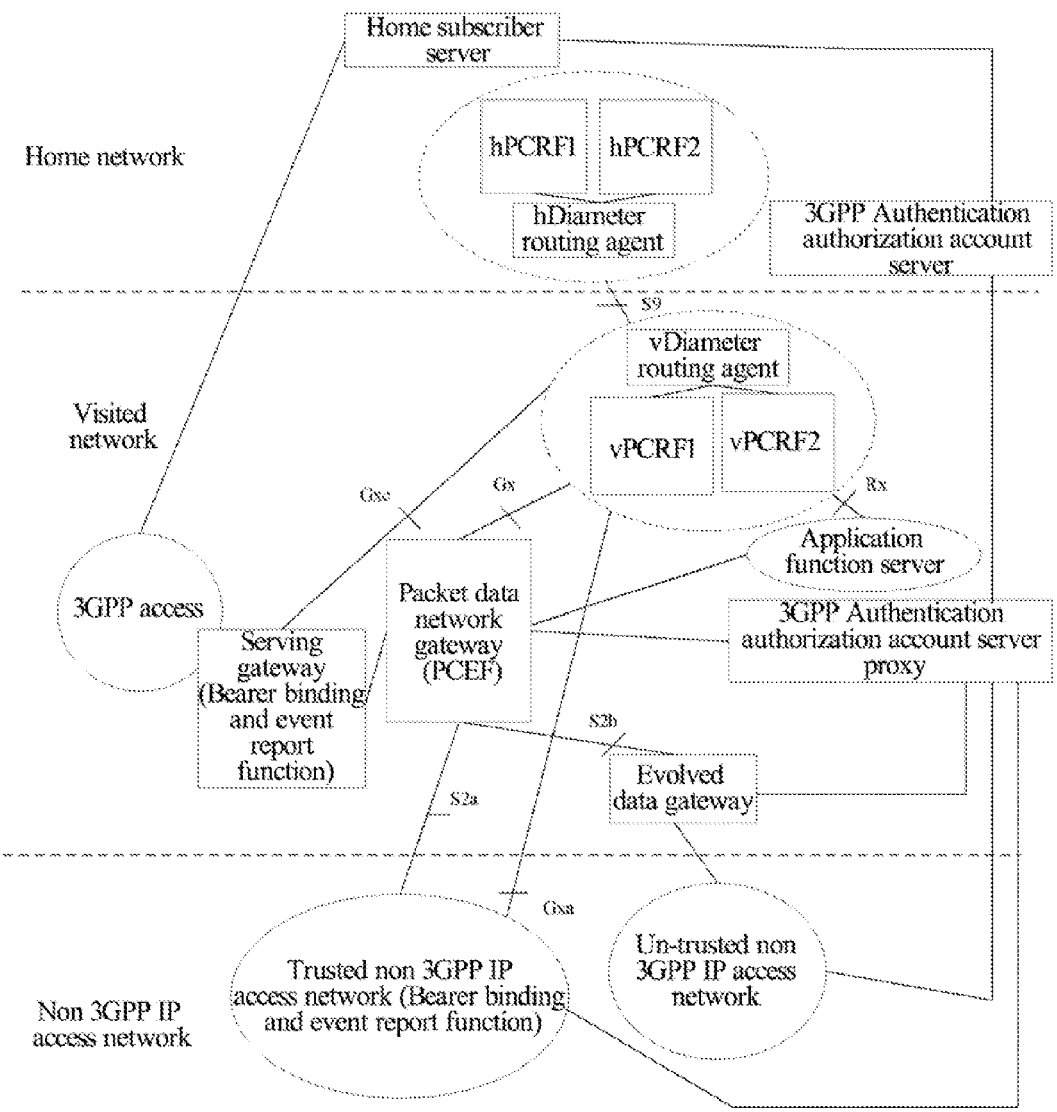
FIG. 6 is a roaming architecture diagram of a EPS of local breakout and visited network operator providing IP services.
Figure 7:
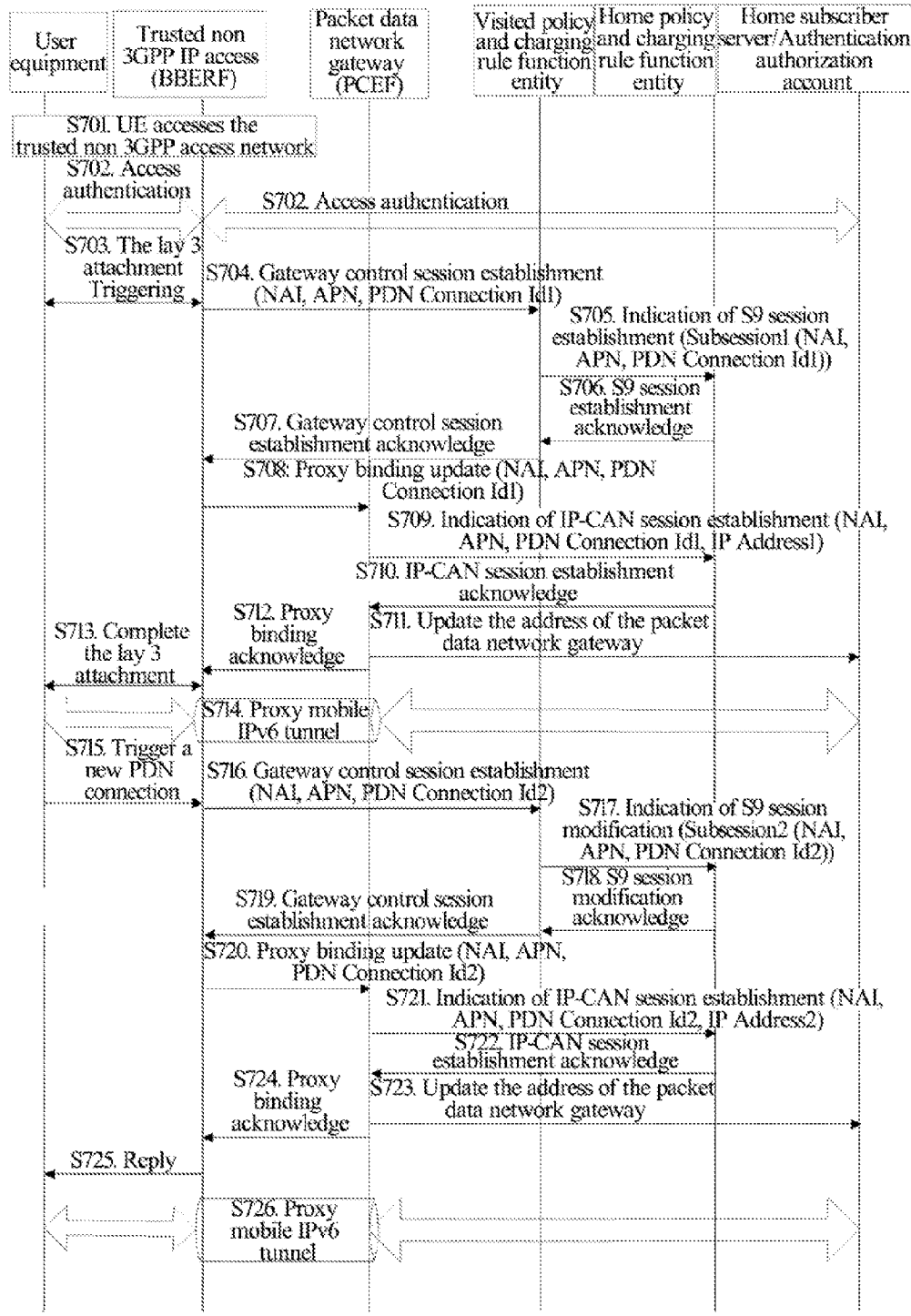
FIG. 7 is a flow chart of embodiment one according to the present invention.
Figure 8A:
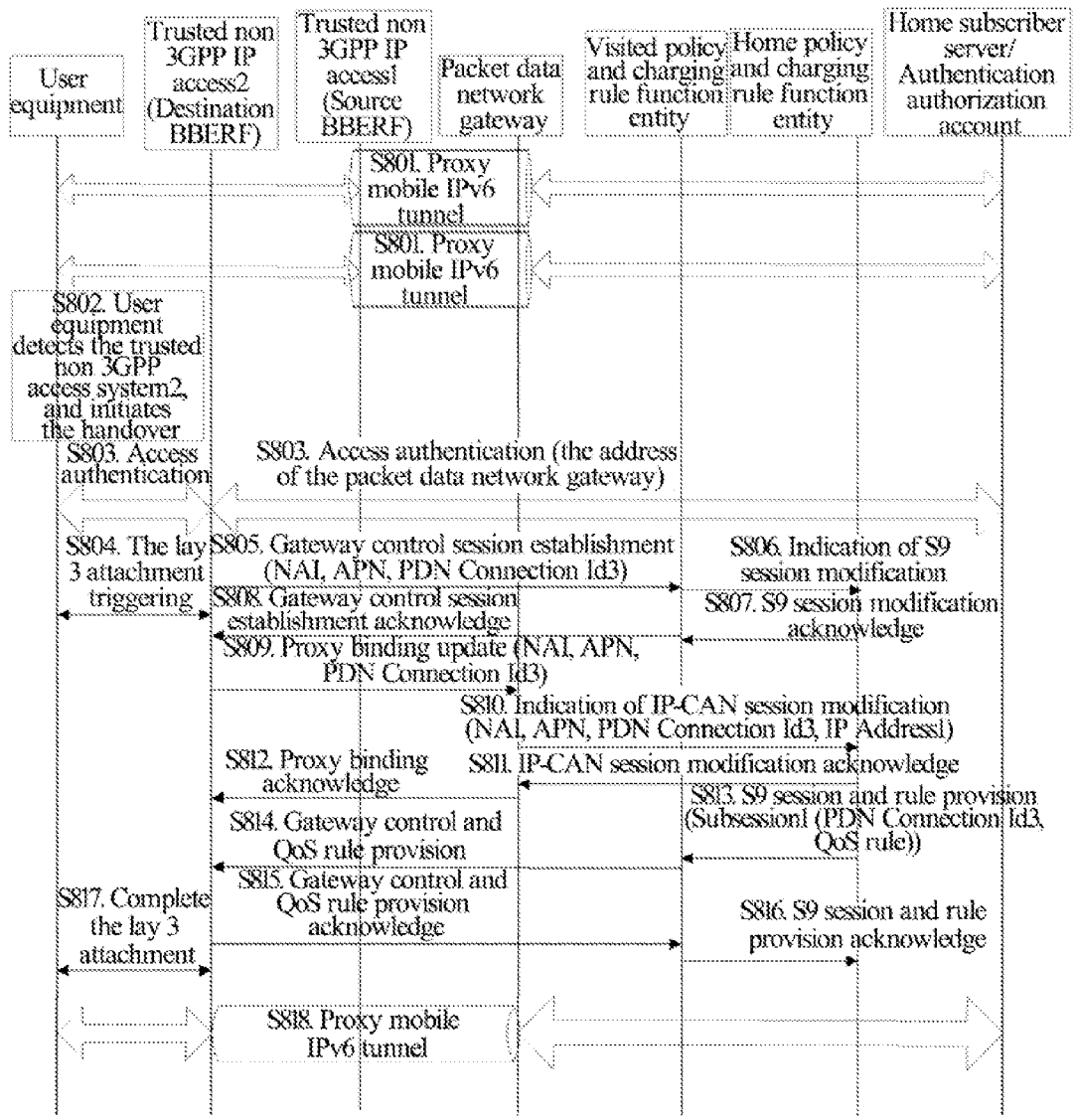
FIG. 8 is a flow chart of embodiment two according to the present invention.
Figure 8B:
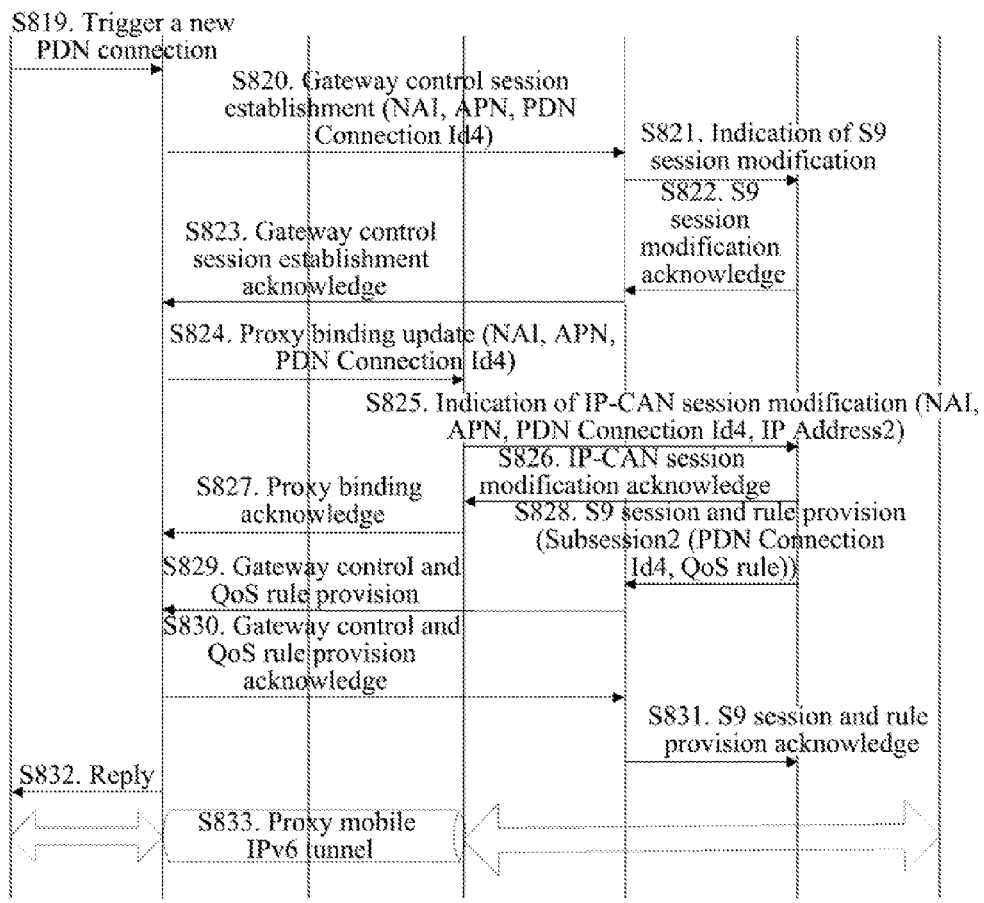
Figure 9A:
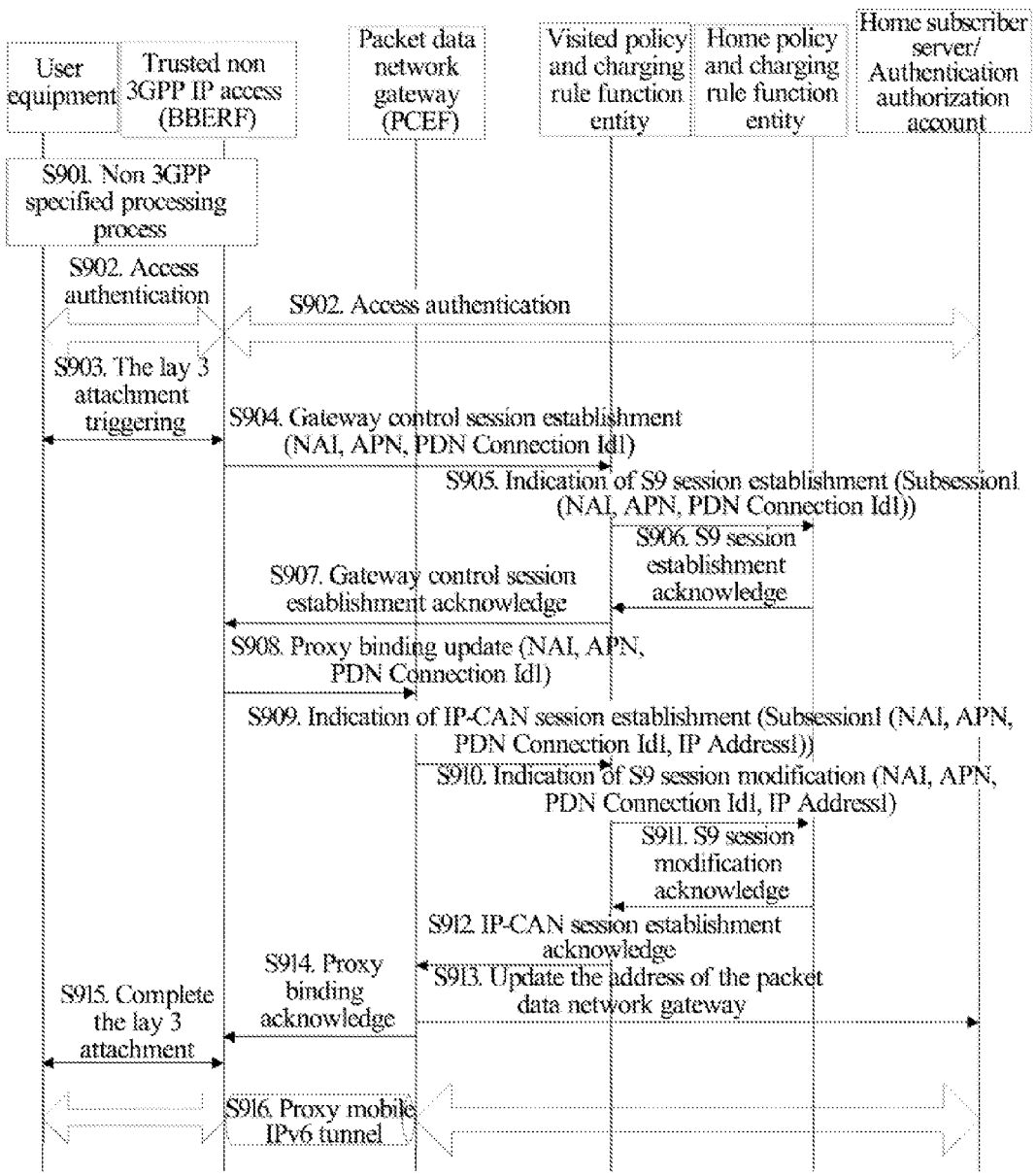
FIG. 9 is a flow chart of embodiment three according to the present invention.
Figure 9B:
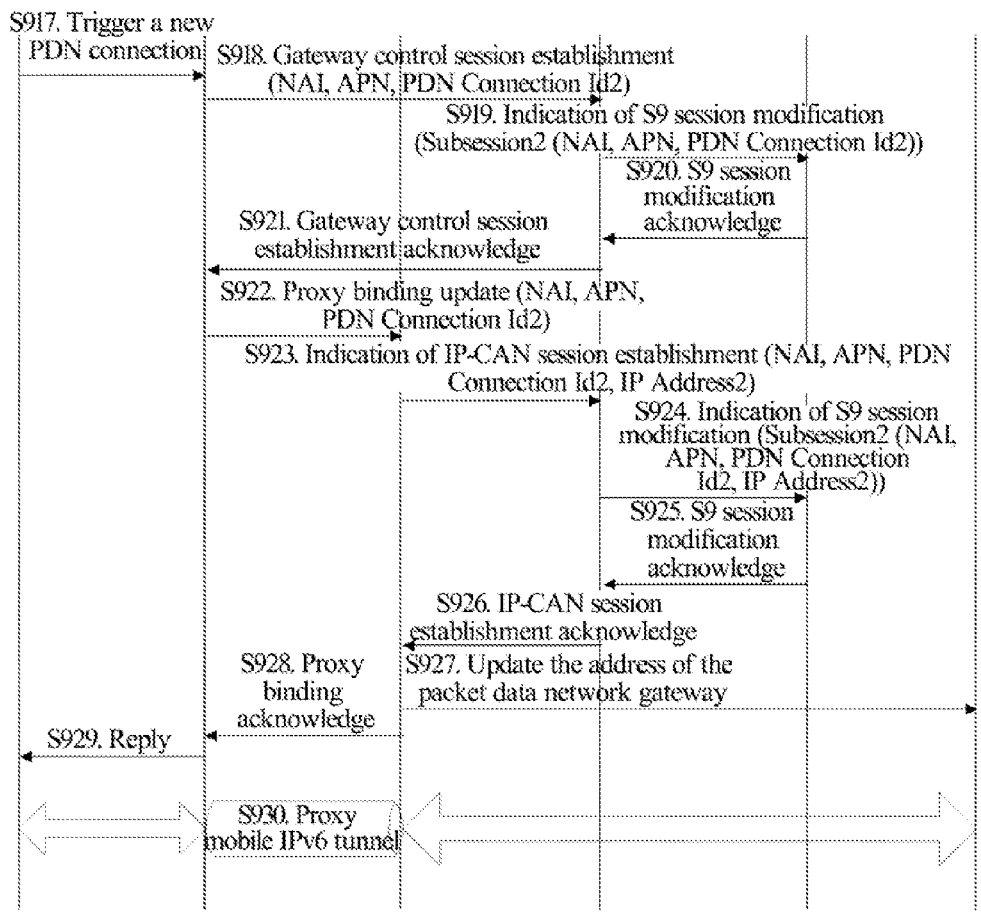
Figure 10A:
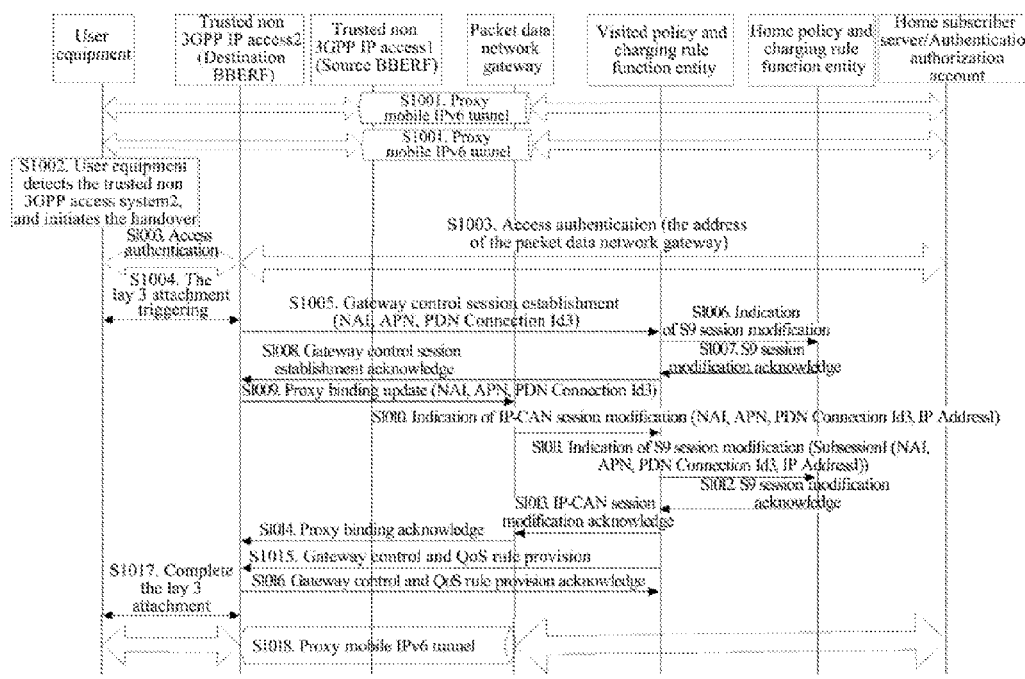
FIG. 10 is a flow chart of embodiment four according to the present invention.
Figure 10B:
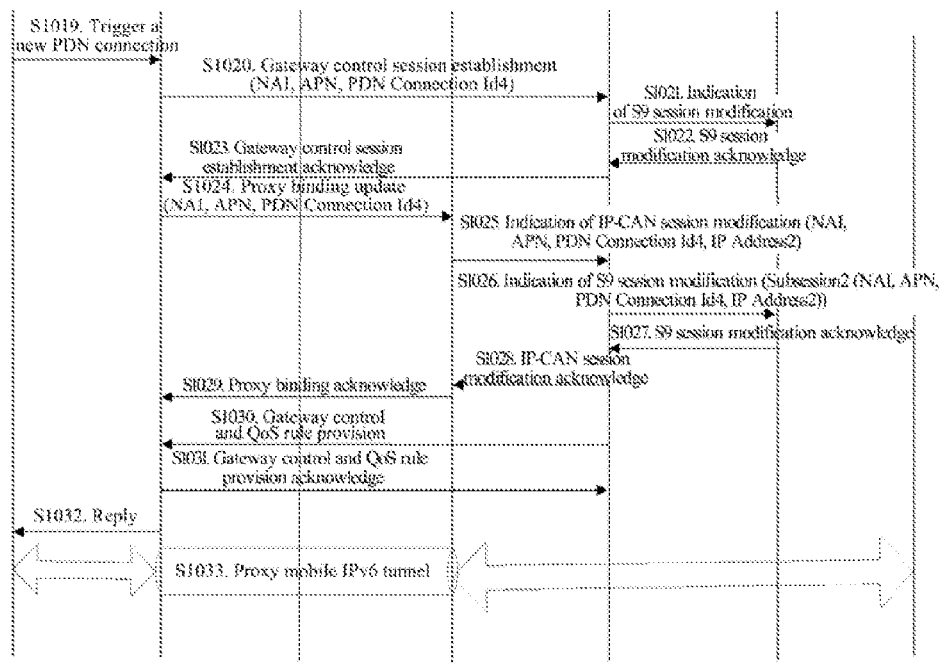

Below the preferable embodiments of the present invention will be described with reference to the accompanying drawings, and it could be understood that the preferable embodiments described herein are only used for illustrating and explaining the present invention, but are not used for limiting the present invention. It should be illustrated that the embodiments and features in the embodiments of the present application can be combined with each other in the case of no conflict.

Below the embodiments of the present invention will be respectively described by different EPS roaming architecture scenarios.

Embodiment 1

The embodiment describes a flow chart of UE accessing the same one APN twice through the trusted non 3GPP access gateway in the roaming scenario that the UE is in the home routed, wherein the PMIPv6 protocol is adopted between the access gateway and the P-GW, and the specific steps are as follows:

step S701, the UE accesses the trusted non 3GPP access network;

step S702, the UE makes a request for performing the EPS access authentication to the HSS/AAA after accessing the trusted non 3GPP access network; the HSS/AAA authenticates the UE which sends the request after receiving the EPS access authentication request; and the HSS/AAA sends the P-GW selection information of the UE and the UE subscribed APN, including the default APN, to the trusted non 3GPP access gateway after completing the authentication on UE;

step S703, the layer 3 attachment flow is triggered after the authentication succeeding;

step S704, the trusted non 3GPP access gateway supports to establish multiple PDN connections regarding to the single APN, and the trusted non 3GPP access gateway allocates the PDN Connection Id1 for uniquely differentiating the PDN connection to be established. The BBERF residing in the trusted non 3GPP access gateway sends the gateway control session establishment request message to the visited PCRF (vPCRF), and the user identifier NAI, the PDN identifier APN and the PDN Connection Id1 are carried in the gateway control session establishment request message. The message makes a request for establishing one gateway control session (the Gxx session), and the identifier is the Gxx session 1;

step S705, the vPCRF determines that the user is a roaming user according to the user identifier NAI and a S9 session has not been established for that user. The vPCRF sends an S9 session establishment indication message to the home PCRF (hPCRF) of the user, and makes a request for establishing one Subsession1 in the S9 session, wherein the user identifier NAI, the PDN identifier APN and PDN Connection Id1 are carried in the Subsession1. The vPCRF maintains the association relationship of the gateway control session established in step S704 with the Subsession1, i.e., the association relationship of the Gxx session1 and the Subsession1;

step S706, the hPCRF makes the PCC rule and the QoS rule according to the user subscription data, the network policy, and the bearer attribute and so on, and also may make the corresponding event trigger at the same time; the hPCRF returns an S9 session establishment acknowledge message to the vPCRF, and includes the made QoS rule in the Subsession1. These rules are not the policies regarding to the specific services, but are only some default policies;

step S707, the vPCRF returns the information in the Subsession1 to the BBERF through the gateway control session establishment acknowledge message;

step S708, the trusted non 3GPP access gateway selects the P-GW according to the P-GW selection information returned in step S702, and sends a proxy binding update message to the selected P-GW, wherein the user identifier NAI, the PDN identifier APN and the PDN Connection Id1 are carried in the message;

step S709, the P-GW allocates the IP Address1 of the PDN connection which is requested for establishing for the UE. Since it is the home routed, the P-GW is located in the home network. The PCEF residing in the P-GW sends the IP-CAN session establishment indication message to the hPCRF, and the user identifier NAI, the IP Address1, the PDN identifier APN and the PDN Connection Id1 are carried in the IP-CAN session establishment indication. message. The message makes a request for establishing one Gx session, and the identifier is the Gx session1;

step S710, after receiving the IP-CAN session establishment indication, the hPCRF associates the IP-CAN session establishment indication message with the previous S9 session establishment indication message according to the user identifier NAI and the PDN identifier APN, and associates the Subsession1 in the S9 session with the IP-CAN session (Gx session1) established in the step S709 according to the PDN Connection Id1. At the same time, the user subscription information is inquired, the previously made rules (QoS, PCC rules and event trigger) are updated according to the user subscription information, the network policy and the bearer attribute and so on, and the hPCRF sends the IP-CAN session establishment acknowledge message to the PCEF in the P-GW, wherein the PCC rule and the event trigger are carried in the IP-CAN session establishment acknowledge message. These rules are not policies regarding to the specific services, but are only some default policies;

step S711, the PCEF in the P-GW installs and enforces the PCC rule carried in the IP-CAN session establishment acknowledge message after receiving the IP-CAN session establishment acknowledge message, and at the same time, the P-GW sends its own IP address to the HSS;

step S712, the P-GW returns the proxy binding acknowledge message to the trusted non 3GPP access gateway, wherein the IP Address1 allocated by the P-GW for the PDN connection established by the UE is carried in the proxy binding acknowledge message;

if the QoS rule made in step S710 is different from that sent down in step S706, then the hPCRF sends the updated QoS rule down to the trusted non 3GPP access gateway. The trusted non 3GPP access gateway installs the QoS rule, and returns a message acknowledge;

step S713, the layer 3 attachment is completed;

step S714, the proxy mobile PMIPv6 tunnel is established between the trusted non 3GPP access gateway and the P-GW, and the UE can send and receive data. The UE can access the dedicated services through the established PDN connection, and the PCRF (including the vPCRF and hPCRF) also can make the corresponding policies for the resource reservation according to the characteristics of the accessed services. These policies can be considered as the dedicated policies for accessing the services;

step S715, the UE decides to initiate to establish the second PDN connection regarding to the default APN, and the UE sends a triggering new PDN connection establishment request message to the trusted non 3GPP access gateway, wherein the PDN identifier APN is carried in the message;

step S716, the trusted non 3GPP access gateway allocates the PDN Connection Id2 for uniquely differentiating the second PDN connection to be established. The BBERF residing in the trusted non 3GPP access gateway sends the gateway control session establishment request message to the visited PCRF, and the user identifier NAI, the PDN identifier APN and the PDN Connection Id2 are carried in the gateway control session establishment request message. The message makes a request for establishing one gateway control session (the Gxx session), and its identifier is the Gxx session2;

step S717, the vPCRF determines that the user is the roaming user according to the user identifier NAI and the S9 session has been established for the user. The vPCRF sends an S9 session modification request message to the home PCRF (hPCRF) of the user, and makes a request for eatablishing one Subsession2 in the S9 session, wherein the user identifier NAI, the PDN identifier APN and the PDN Connection Id2 are carried in the Subsession2. The vPCRF maintains the association relationship of the gateway control session (Gxx session2) established in step S715 and the Subsession2;

step S718, the hPCRF makes the PCC rule and the QoS rule according to the user subscription data, the network policy, and the bearer attribute and so on, and at the same time, also may make the corresponding event trigger; the hPCRF returns an S9 session modification acknowledge message to the vPCRF, and includes the made QoS rule and event trigger in the Subsession2. These rules are not the policies regarding to the specific services, but are only some default policies;

step S719, the vPCRF returns the information in the Subsession2 to the BBERF through the gateway control session acknowledge message;

step S720, the trusted non 3GPP access gateway sends the proxy binding update message to the P-GW, wherein the user identifier NAI, the PDN identifier APN and the PDN Connection Id2 are carried in the message;

step S721, the P-GW allocates the IP Address2 of the second established PDN connection for the UE. The PCEF residing in the P-GW sends the IP-CAN session establishment indication to the hPCRF, wherein the user identifier NAI, the IP Address2, the PDN identifier APN and the PDN Connection Id2 are carried in the LP-CAN session establishment indication. The message makes a request for establishing one Gx session, and the identifier is the Gx session2;

step S722, after receiving the IP-CAN session establishment indication, the hPCRF associates the IP-CAN session establishment indication message with the indication of S9 session modification message in step S717 according to the user identifier NAI and the PDN identifier APN, and associates the IP-CAN session (Gx session2) with the Subsession2 according to the PDN Connection Id2. At the same time, the PCRF inquires the user subscription information, may update the previous made rules (PCC and QoS rules) according to the user subscription information, the network policy and the bearer attribute and so on, and the hPCRF sends the IP-CAN session establishment acknowledge message to the PCEF in the P-GW, wherein the PCC rule is carried in the IP-CAN session establishment acknowledge message. These rules are not policies regarding to the specific services, but are only some default policies;

step S723, the PCEF in the P-GW installs and enforces the PCC rule carried in the IP-CAN session establishment acknowledge message after receiving the IP-CAN session establishment acknowledge message, and at the same time, the P-GW sends its own IP address to the HSS;

step S724, the P-GW returns the proxy binding acknowledge message to the trusted non 3GPP access gateway, wherein the IP Address2 allocated by the P-GW for the second PDN connection established by the UE is carried in the proxy binding acknowledge message;

if the QoS rule made in step S722 is different from that sent down in step S718, then the hPCRF sends the updated QoS rule down to the trusted non 3GPP access gateway, and the trusted non 3GPP access gateway installs the QoS rule and returns a acknowledge message;

step S725, the trusted non 3GPP access gateway returns the reply message carrying the IP Address2 to the UE;

step S726, the second PMIPv6 tunnel is established between the trusted non 3GPP access gateway and the P-GW, and the UE can send and receive data. UE will use the second established PDN connection to access a plurality of dedicated services in the subsequent flows, and the PCRF (including the vPCRF and hPCRF) will make the corresponding policies for the resource reservation according to the characteristics of the services. These policies can be considered as the dedicated policies for accessing the services.

The UE accesses the EPC through the E-URTAN, the PMIPv6 protocol is adopted between the S-GW and the P-GW, and the flow of establishing multiple PDN connections regarding to one APN is similar to that. The difference is that the MME will allocate one default bearer identifier for the default bearer of each PDN connection established by the UE, and the MME sends this identifier to the S-GW. The S-GW sends that identifier to the PCRF and the P-GW for the association between the sessions.

Embodiment 2

The embodiment describes a flow chart of handover occurring (namely, the relocation occurring on the BBERF) after UE establishing two PDN connections regarding to the same one APN through the flow of the embodiment 1 in the roaming scenario that the UE is in the home routed, wherein the PMIPv6 protocol is adopted between the access gateway and the P-GW, and the specific steps are as follows:

step S801, the UE accesses through the trusted non 3GPP access network1, establishes two PDN connections regarding to the APN, and the UE accesses respective dedicated services through two PDN connections respectively. The dedicated PCC rule and QoS rule made by the hPCRF for respective dedicated services are used for the resource reservation of the bearer layer.

Step S802, the UE detects the trusted non 3GPP access network2, and decides to initiate the handover;

step S803, the UE makes a request for performing the EPS access authentication to the HSS/AAA after accessing the trusted non 3GPP access network2; the HSS/AAA authenticates the UE which sends the request after receiving the EPS access authentication request; and the HSS/AAA sends the address of the P-GW and the UE subscribed APN, including the default APN, selected by the UE through the access network1 to the trusted non 3GPP access gateway2 after completing the authentication on the UE;

step S804, the layer 3 attachment flow is triggered after the authentication succeeding;

step S805, the trusted non 3GPP access gateway2 supports to establish multiple PDN connections regarding to the single APN, and the trusted non 3GPP access gateway2 allocates the PDN Connection Id3 for uniquely differentiating the PDN connection to be re-established. The BBERF (the destination BBERF) residing in the trusted non 3GPP access gateway2 sends the gateway control1 session establishment request message to the vPCRF, wherein the user identifier NAI, the PDN identifier APN and the PDN Connection Id3 are carried in the gateway control session establishment request message. The message makes a request for establishing one gateway control session (the Gxx session), and the identifier is the Gxx session 3;

since there is no information exchange between the trusted non 3GPP access gateway1 and the trusted non 3GPP access gateway2, the respective allocated PDN Connection Ids are different.

Step S806, the vPCRF determines that the handover of the user occurs and information before the user hands over (including an S9 session established before the handover) is found according to the user identifier NAI and the PDN identifier APN. However, since the PDN Connection Id3 is a new identifier, the vPCRF is unable to judge which PDN connection before the handover should be associated with the PDN Connection Id3 (namely, which Subsession in the S9 session before the handover is associated with), thus the vPCRF is unable to include the information carried in the gateway control session into a certain specific Subsession to report to the hPCRF. The vPCRF sends an indication of S9 session modification message to the hPCRF, and notifies the hPCRF of the handover of UE occurring;

step S807, the hPCRF is similarly unable to judge which PDN connection before the handover will be re-established by the UE, and thus the hPCRF is unable to send down the dedicated policy related to a certain specific service accessed before the handover. The hPCRF is only able to make the QoS rule according to the user subscription, the network policy and the new access network bearer attribute and so on, and sends these default QoS rule and event trigger down to the vPCRF through the S9 session level of the S9 session modification acknowledge message. These rules can be considered as the universal rules for two PDN connections. Certainly, the hPCRF also may not send any rule down, and only return the acknowledge message;

step S808, if the QoS rule and event trigger are carried in step S807, then the vPCRF sends the default QoS rule and event trigger to the BBERF in the trusted non 3GPP access gateway2 through the gateway control establishment acknowledge message. The BBERF in the trusted non 3GPP access gateway2 installs the QoS rule and the event trigger;

step S809, the trusted non 3GPP access gateway2 sends the proxy binding update message to the P-GW, wherein the user identifier NAI, the PDN identifier APN and the PDN Connection Id3 are carried in the message, and the step S809 can be send just after receiving the message of step S804 instead of waiting for the response of step S808;

step S810, after receiving the proxy binding update message, the P-GW in which the PCEF resides decides to re-establish the first PDN connection established in the source system for UE at first, and thus the PCEF sends the indication of IP-CAN session modification message (the message modifies the first IP-CAN session established by the source system, namely, the Gx session1) to the hPCRF, wherein the PDN Connection Id3 is carried in the indication of IP-CAN session modification, and the message can further carried the user identifier NAI, the PDN identifier APN and the IP Address1;

step S811, the hPCRF may modify the PCC rule, the QoS rule and the event trigger (including the default rule and dedicated rule) of the first PDN connection which is established before the handover of the UE according to information such as the new access network bearer attribute and so on after receiving the indication of IP-CAN session modification, and sends the updated PCC rule and event trigger to the PCEF in the P-GW through the IP-CAN session modification acknowledge message. The PCEF in the P-GW installs and enforces the PCC rule and event trigger after receiving the IP-CAN session modification acknowledge message;

step S812, the P-GW returns the proxy binding acknowledge message carrying the IP Address1 to the trusted non 3GPP access gateway2;

step S813, since the Gx session1 associates with the Subsession1 before the handover, the hPCRF sends the S9 session and a rule provision message to the vPCRF, and carries the PDN Connection Id3 and the dedicated QoS rule and event trigger of the dedicated service accessed by the UE through the first PDN before the handover in the Subsussion1; and these policies may be modified in step S811;

step S814, the vPCRF associates the gateway control session (Gxx session3) established in step S805 with Subsession1 according to the PDN Connection Id3, and sends the QoS rule and event trigger to the BBERF in the trusted non 3GPP access gateway2 through the gateway control and QoS rule provision message;

step S815, the BBERF in the trusted non 3GPP access gateway2 installs and enforces the QoS rule and the event trigger, and returns the acknowledge message to the vPCRF;

step S816, the vPCRF returns the acknowledge message to the hPCRF;

step S817, the layer 3 attachment is completed;

step S818, the PMIPv6 tunnel is established between the trusted non 3GPP access gateway2 and the P-GW, and the UE re-establishes the first PDN connection from the source system to the default APN. The UE can access the dedicated services which have been applied in the source system through the PDN connection;

step S819, UE sends the triggering indication message to the trusted non 3GPP access gateway2, wherein the APN and a handover indication are carried in the triggering indication message, and the handover indication is used for denoting to the trusted non 3GPP access gateway2 that one PDN connection before the handover is re-established;

step S820, the trusted non 3GPP access gateway2 in which the BBERF resides allocates the PDN Connection Id4 for uniquely differentiating the PDN connection to be re-established. The BBERF in the trusted non 3GPP access gateway2; sends the gateway control session establishment request message, which includes the user identifier NAI, the PDN identifier APN and the PDN Connection Id4, to the vPCRF. The message makes a request for establishing one gateway control session (Gxx session), and the identifier is Gxx session 4;

step S821, the vPCRF finds the information before the handover of the user (including the S9 session established before the handover) according to the user identifier NAI and the PDN identifier APN. However, since the PDN Connection Id4 is a new identifier, the vPCRF is unable to judge that the PDN Connection Id4 is associated with which PDN connection before the handover (namely, associated with which Subsession in the S9 session before the handover), and thus the vPCRF is unable to include information carried in the gateway control session into a certain specific Subsession to report to the hPCRF. The vPCRF sends the indication of S9 session modification message to the hPCRF to notify the hPCRF that handover occurs on the UE.

Step S822, the hPCRF is either unable to judge which PDN connection before the handover will be re-established by the UE, and thus the hPCRF is unable to send down the dedicated policy related to a certain specific service accessed before the handover. The hPCRF is only able to make the QoS according to information such as the user subscription, the network policy and the new access network bearer attribute and so on, and send these default QoS rule and event trigger down to the vPCRF through the S9 session level of the S9 session modification acknowledge message. These rules can be considered as the universal rules for the two PDN connections. Certainly, the hPCRF also may not send any rule down and only return the acknowledge message;

step S823, if the QoS rule and event trigger are carried in the step S822, then the vPCRF sends the default QoS rule and event trigger to the BBERF in the trusted non 3GPP access gateway2 through the gateway control establishment acknowledge message. The BBERF in the trusted non 3GPP access gateway2 installs the QoS rule and event trigger;

step S824, the trusted non 3GPP access gateway2 sends the proxy binding update message to the P-GW, wherein the user identifier NAI, the PDN identifier APN and the PDN Connection Id4 are carried in the message, and the step S824 can be sent just after receiving the message of step S819 without waiting for the response of the step S823;

step S825, the P-GW in which the PCEF resides decides to re-establish the second PDN connection which is established in the source system for the UE after receiving the proxy binding update message, thus the PCEF, sends the indication of IP-CAN session modification message (the message modifies the second IP-CAN session (Gx session2) established in the source system) to the hPCRF, wherein the PDN Connection Id4 is carried in the indication of IP-CAN session modification, and the message can further carry the user identifier NAI, the PDN identifier APN and the IP Address2;

step S826, the hPCRF may modify the PCC rule, QoS rule and event trigger (including the default rule and dedicated rule) of the second PDN connection which is established before the handover of the UE according to information such as the new access network bearer attribute and so on after receiving the indication of IP-CAN session modification, and sends the updated PCC rule and event trigger to the PCEF in the P-GW through the IP-CAN session modification acknowledge message. The PCEF installs and enforces the PCC rule and event trigger after receiving the IP-CAN session modification acknowledge message;

step S827, the P-GW returns the proxy binding acknowledge message carrying the IP Address2 to the trusted non 3GPP access gateway2;

step S828, since the Gx session 2 is associated with the Subsession2 before the handover, the hPCRF sends the S9 session and the rule provision message to the vPCRF, and the PDN Connection Id4 and the dedicated QoS rule and event trigger of the specified service accessed by the UE through the second PDN before the handover are carried in the Subsession2, and these rules may be modified in step S826;

step S829, the vPCRF associates the gateway control session (Gxx session4) established in step S820 with Subsession2 according to the PDN Connection Id4, and sends the QoS rule and event trigger in Subsession2 to the BBERF in the trusted non 3GPP access gateway2 through the gateway control and QoS rule provision message;

step S830, the BBERF in the trusted non 3GPP access gateway2 installs and enforces the QoS rule and the event trigger, and returns the acknowledge message to the vPCRF;

step S831, the vPCRF returns the acknowledge message to the hPCRF;

step S832, the trusted non 3GPP access gateway2 returns the reply message to the UE, wherein the reply message carries the IP Address2;

step S833, the PMIPv6 tunnel is further established between the trusted non 3GPP access gateway2 and the P-GW, and the UE re-establishes the second PDN connection from the source system to the default APN. The UE can access, through the PDN connection, the dedicated services which have been applied in the source system.

In other embodiments, after the vPCRF receives the message of step S805 or the message of step S820, the vPCRF is unable to judge which Subsession is associated with the Gxx session 3, and the vPCRF can perform no interaction with the hPCRF. Other steps are not changed.

In other embodiments, after the vPCRF receives the message of step S820, the vPCRF knows that two PDN connections are established by the UE before the handover, and the vPCRF has known that the Gxx session3 has been associated with the Subsession1 after step S813, at this time, there is only one Subsession2 on the vPCRF has not been associated, and thus the vPCRF can directly associate the Gxx session4 with the Subsession2 at this time.

The UE is handed over from the trusted non 3GPP access network to the 3GPP access (E-UTRAN), and at the time of the 3GPP accessing, the PMIPv6 protocol is adopted between the S-GW and the P-GW, and thus the handover flow of establishing multiple PDN connections regarding to one APN is similar to this. The difference is that, at the time of the 3GPP accessing, the MME will allocate one default bearer identifier for the default bearer of each PDN connection established by the UE, and the MME will send the identifier to the S-GW. The S-GW sends the identifier to the PCRF and the P-GW for the association between the sessions.

The flow of the handover of the UE across the S-GWs inside the 3GPP accessing is similar to this, and the difference is that the default bearer identifier allocated by the MME is used for uniquely identifying one PDN connection.

In view of the PCC, all of these handover scenarios can be unified to call as the BBERF relocation.

Embodiment 3

The embodiment describes a flow chart of UE accessing the same one APN twice through the trusted non 3GPP access gateway in the roaming scenario that the UE is in the local breakout, wherein the PMIPv6 protocol is adopted between the access gateway and the P-GW, and the specific steps are as follows:

step S901, the UE accesses the trusted non 3GPP access network;

step S902, the UE makes a request for performing the EPS access authentication to the HSS/AAA after accessing the trusted non 3GPP access network; the HSS/AAA authenticates the UE which sends the request after receiving the EPS access authentication request; and the HSS/AAA sends the P-GW selection information of the UE and the user subscribed APN, including the default APN, to the trusted non 3GPP access gateway after completing the authentication on UE;

step S903, the layer 3 attachment flow is triggered after the authentication succeeding;

step S904, the trusted non 3GPP access gateway supports to establish multiple PDN connections regarding to the single APN, and the trusted non 3GPP access gateway allocates the PDN Connection Id1 for uniquely differentiating the PDN connection to be established. The BBERF residing in the trusted non 3GPP access gateway sends the gateway control session establishment request message to the visited PCRF (vPCRF), and the user identifier NAI, the PDN identifier APN and the PDN Connection Id1 are carried in the gateway control session establishment request message. The message makes a request for establishing one gateway control session (the Gxx session), and the identifier is the Gxx session 1;

step S905, the vPCRF determines that the user is a roaming user according to the user identifier NAI and the S9 session has not been established for that user. The vPCRF sends an S9 session establishment indication message to the home PCRF (hPCRF) of the user, and makes a request for establishing one Subsession1 in the S9 session, wherein the user identifier NAI, the PDN identifier APN and PDN Connection Id1 are carried in the Subsession1. The vPCRF maintains the association relationship of the gateway control session established in step S904 with the Subsession1, i.e., the association relationship of the Gxx session1 and the Subsession1;

step S906, the hPCRF makes the PCC rule and the QoS rule according to the user subscription data, the network policy, and the current access network bearer attribute and so on, and also may make the corresponding event trigger at the same time; the hPCRF returns an S9 session establishment acknowledge message to the vPCRF, and includes the made QoS rule in the Subsession1. These rules are not the policies regarding to the specific services, but are only some default policies;

step S907, the vPCRF returns the information in the Subsession1 to the BBERF through the gateway control session acknowledge message;

step S908, the trusted non 3GPP access gateway selects the P-GW according to the P-GW selection information returned in step S902, and sends a proxy binding update message to the selected P-GW, wherein the user identifier NAI, the PDN identifier APN and the PDN Connection Id1 are carried in the message;

step S909, the P-GW allocates IP Address1 of the PDN connection which is requested to for establishing for the UE. Since it is the local breakout, the P-GW is located in visited network. The PCEF residing in the P-GW sends an IP-CAN session establishment indication to the vPCRF, and the user identifier NAI, the IP Address1, the PDN identifier APN and the PDN Connection Id1 are carried in the IP-CAN session establishment indication. The message makes a request for establishing one Gx session, and the identifier is the Gx session1;

step S910, the vPCRF associates the Gx session1 with the Gxx session1 established in step S904 and the Subsession1 of the S9 session established in the step S905 according to the user identifier NAI, the PDN identifier APN and the PDN Connection Id1 after receiving the IP-CAN session establishment indication. The vPCRF sends the indication of S9 session modification to the hPCRF, and the IP Address1 is carried in the Subsession1, and the user identifier NAI, the PDN identifier APN and the PDN Connection Id1 further can be carried in the Subsession1;

step S911, the hPCRF includes the PCC rule and event trigger made in step S906 into the Subsession1 to return to the vPCRF. The hPCRF may update the rules (QoS and PCC rules and the event trigger) made before. These rules are not policies regarding to the specific services, but are only some default policies;

step S912, the vPCRF returns the policies included in the Subsession1 to the PCEF in the P-GW through the IP-CAN session establishment acknowledge message;

step S913, the PCEF in the P-GW installs and enforces the PCC rule and event trigger carried in the IP-CAN session establishment acknowledge message after receiving the IP-CAN session establishment acknowledge message, and at the same time, the P-GW sends its own IP address to the HSS;

step S914, the P-GW returns the proxy binding acknowledge message to the trusted non 3GPP access gateway, wherein the IP Address1 allocated by the P-GW for the PDN connection established by the UE is carried in the proxy binding acknowledge message;

if the QoS rule made in step S911 is different from that sent down in step S906, then the hPCRF sends the updated QoS rule down to the trusted non 3GPP access gateway. The trusted non 3GPP access gateway installs the QoS rule, and returns a message acknowledge.

Step S915, the layer 3 attachment is completed;

step S916, the PMIPv6 tunnel is established between the trusted non 3GPP access gateway and the P-GW, and the UE can send and receive data. The UE can access the dedicated services through the established PDN connection, and the vPCRF also can make the corresponding policies for the resource reservation according to the characteristics of the accessed services. These policies can be considered as the dedicated policies for accessing the services;

step S917, the UE decides to initiate to establish the second PDN connection regarding to the default APN, and the UE sends a triggering new PDN connection establishment request message to the trusted non 3GPP access gateway, wherein the default APN is carried in the message;

step S918, the trusted non 3GPP access gateway allocates the PDN Connection Id2 for uniquely differentiating the second PDN connection to be established. The BBERF residing in the trusted non 3GPP access gateway sends the gateway control session establishment request message to the PCRF, and the user identifier NAI, the PDN identifier APN and the PDN Connection Id2 are carried in the gateway control session establishment request message. The message makes a request for establishing one gateway control session (the Gxx session), and its identifier is the Gxx session2;

step S919, the vPCRF determines that the user is the roaming user according to the user identifier NAI and the S9 session has been established for the user. The vPCRF sends an S9 session modification request message to the hPCRF of the user, and makes a request for establishing one Subsession2 in the S9 session, wherein the user identifier NAI, the PDN identifier APN and the PDN Connection Id2 are carried in the Subsession2. The vPCRF maintains the association relationship of the gateway control session (Gxx session2) established in step S918 and the Subsession2;

step S920, the hPCRF makes the PCC rule and the QoS rule according to the user subscription data, the network policy, and the current access network bearer attribute and so on, and at the same time, also may make the corresponding event trigger. The hPCRF returns an S9 session modification acknowledge message to the vPCRF, and includes the made QoS rule and event trigger in the Subsession2. These rules are not the policies regarding to the specific services, but are only some default policies;

step S921, the vPCRF returns the information in the Subsession2 to the BBERF through the gateway control session acknowledge message;

step S922, the trusted non 3GPP access gateway sends the proxy binding update message to the P-GW, wherein the user identifier NAI, the PDN identifier APN and the PDN Connection Id2 are carried in the message;

step S923, the P-GW allocates the IP Address2 of the second established PDN connection for the UE. The PCEF residing in the P-GW sends the IP-CAN session establishment indication to the PCRF, wherein the user identifier NAI, the IP Address2, the PDN identifier APN and the PDN Connection Id2 are carried in the IP-CAN session establishment indication. The message makes a request for establishing one Gx session, and the identifier is the Gx session2;

step S924, the vPCRF associates the Gx session2 with the gateway control session (Gxx session2) established in step S918 and the Subsession2 of the S9 session established in step S919 according to the user identifier NAI, the PDN identifier APN and the PDN Connection Id2 after receiving the IP-CAN session establishment indication. The vPCRF sends an indication of S9 session modification to the hPCRF, and the IP Address2 is carried in the Subsession2, and the user identifier NAI, the PDN identifier APN and the PDN Connection Id2 further can be carried in the Subsession2;

step S925, the hPCRF includes the PCC rule and the event trigger made in step S920 into the Subsession2 to return to the vPCRF. The hPCRF may update the previously made rules (QoS and PCC rules and the event trigger). These rules are not policies regarding to the specific services, but are only some default policy;

step S926, the vPCRF returns the policies included in the Subsesssion2 to the PCEF in the P-GW through the IP-CAN session establishment acknowledge message;

step S927, the PCEF in the P-GW installs and enforces the PCC rule carried in the IP-CAN session establishment acknowledge message after receiving the IP-CAN session establishment acknowledge message, and at the same time, the P-GW sends its own IP address to the HSS;

step S928, the P-GW returns the proxy binding acknowledge message to the trusted non 3GPP access gateway, wherein the IP Address2 allocated by the P-GW for the second PDN connection established by the UE is carried in the proxy binding acknowledge message;

if the QoS rule made in step S925 is different from that sent down in step S920, then the PCRF sends the updated QoS rule down to the trusted non 3GPP access gateway, and the trusted non 3GPP access gateway installs the QoS rule and returns a acknowledge message;

step S929, the trusted non 3GPP access gateway returns the reply message carrying the IP Address2 to the UE;

step S930, the second PMIPv6 tunnel is established between the trusted non 3GPP access gateway and the P-GW, and the UE can send and receive data. UE will use the second established PDN connection to access a plurality of dedicated services in the subsequent flows, and the PCRF will make the corresponding policies for the resource reservation according to the characteristics of the services. These policies can be considered as the dedicated policies for accessing the services.

The UE accesses the EPC through the E-URTAN, the PMIPv6 protocol is adopted between the S-GW and the P-GW, and the flow of establishing multiple PDN connections regarding to one APN is similar to that. The difference is that the MME will allocate one default bearer identifier for the default bearer of each PDN connection established by the UE, and the MME sends this identifier to the S-GW. The S-GW sends that identifier to the PCRF and the P-GW for the association between the sessions.

Embodiment 4

The embodiment describes a flow chart of handover occurring after UE establishing two PDN connections regarding to the same one APN through the flow of the embodiment 3 in the roaming scenario that the UE is in the local breakout, wherein the PMIPv6 protocol is adopted between the access gateway and the P-GW, and the specific steps are as follows:

step S1001, the UE accesses through the trusted non 3GPP access network1, establishes two PDN connections regarding to the APN, and the UE accesses respective dedicated services through two PDN connections respectively. The dedicated PCC rule and QoS rule made by the hPCRF for dedicated services are used for the resource reservation of the bearer layer.

Step S1002, the UE detects the trusted non 3GPP access network2, and decides to initiate the handover;

step S1003, the UE makes a request for performing the EPS access authentication to the HSS/AAA after accessing the trusted non 3GPP access network2; the HSS/AAA authenticates the UE which sends the request after receiving the EPS access authentication request; and the HSS/AAA sends the address of the P-GW and the UE subscribed APN, including the default APN, selected by the UE through the access network1 to the trusted non 3GPP access gateway2 after completing the authentication on the UE;

step S1004, the layer 3 attachment flow is triggered after the authentication succeeding;

step S1005, the trusted non 3GPP access gateway2 supports to establish multiple PDN connections regarding to the single APN, and the trusted non 3GPP access gateway2 allocates the PDN Connection Id3 for uniquely differentiating the PDN connection to be re-established. The BBERF (the destination BBERF) residing in the trusted non 3GPP access gateway2 sends the gateway control session establishment request message to the vPCRF, wherein the user identifier NAI, the PDN identifier APN and the PDN Connection Id3 are carried in the gateway control session establishment request message. The message makes a request for establishing one gateway control session (the Gxx session), and the identifier is the Gxx session 3;

since there is no information exchange between the trusted non 3GPP access gateway1 and the trusted non 3GPP access gateway2, the respective allocated PDN Connection Ids are different.

Step S1006, the vPCRF determines that the handover of the user occurs and information before the user hands over (including an S9 session established before the handover) is found according to the user identifier NAI and the PDN identifier APN. However, since the PDN Connection Id3 is a new identifier, the vPCRF is unable to judge which PDN connection before the handover should be associated with the PDN Connection Id3 (namely, which Subsession in the S9 session before the handover is associated with), thus the vPCRF is unable to include the information carried in the gateway control session into a certain specific Subsession to report to the hPCRF. The vPCRF sends an indication of S9 session modification message to the hPCRF, and notifies the hPCRF of the handover of UE occurring;

step S1007, the hPCRF is similarly unable to judge which PDN connection before the handover will be re-established by the UE, and thus the hPCRF is unable to send down the dedicated policy related to a certain dedicated service accessed before the handover. The hPCRF is only able to make the QoS rule and the event trigger according to the user subscription, the network policy and the new access network bearer attribute and so on, and sends these default policies QoS rule and event trigger down to the vPCRF through the S9 session level of the S9 session modification acknowledge message. These rules can be considered as the universal rules for two PDN connections. Certainly, the hPCRF also may not send any rule down and only return the acknowledge message;

step S1008, if the QoS rule and event trigger are carried in step S1007, then the vPCRF sends the default QoS rule and event trigger to the BBERF in the trusted non 3GPP access gateway2 through the gateway control establishment acknowledge message. The BBERF in the trusted non 3GPP access gateway2 installs the QoS rule and the event trigger;

step S1009, the trusted non 3GPP access gateway2 sends the proxy binding update message to the P-GW, wherein the user identifier NAI, the PDN identifier APN and the PDN Connection Id3 are carried in the message, and the step S1009 can be send just after receiving the message of step S1004 instead of waiting for the response of step S1008;

step S1010, after receiving the proxy binding update message, the P-GW in which the PCEF resides decides to re-establish the first PDN connection established in the source system for UE at first, and thus the PCEF sends the indication of IP-CAN session modification message (the message modifies the first IP-CAN session (Gx session1) established by the source system) to the vPCRF, wherein the PDN Connection Id3 is carried in the indication of IP-CAN session modification, and the message can further carried the user identifier NAI, the PDN identifier APN and the IP Address1;

step S1011, the vPCRF associates the gateway control session (Gxx session3) established in step S1005 with the Gx session1 and the Subsession1 of the S9 session according to the user identifier NAI, the PDN identifier APN and the PDN Connection Id3 (since the Gx session1 in the embodiment 3 is associated with the Subsession1 of the S9 session, the vPCRF associates the Gxx session3 with the Gx session1 according to the user identifier NAI, the PDN identifier APN and the PDN Connection Id3, thereby the Gxx session3 is also associated with the Subsession 1). The vPCRF sends the indication of S9 session modification to the hPCRF, and includes the user identifier NAI, the PDN identifier APN, the IP address1 and the PDN Connection Id3 into the Subsession1;

step S1012, the hPCRF may update the PCC rule, QoS rule and event trigger (including the default rules and dedicated rules) of the first PDN connection which is established before the handover of the UE according to information such as the new access network bearer attribute and so on after receiving the indication of S9 session modification message, and includes the PCC, QoS rules and event trigger into the Subsession1 to send to the vPCRF through the S9 session modification acknowledge message;

step S1013, the vPCRF sends the PCC rule and the event trigger to the P-GW through the IP-CAN session modification acknowledge message of the Gx session1, installs and enforces the PCC rule and the event trigger;

step S1014, the P-GW returns the proxy binding acknowledge message carrying the IP Address1 to the trusted non 3GPP access gateway2;

step S1015, the vPCRF sends the QoS rule and the event trigger to the BBERF in the trusted non 3GPP access gateway2 through the gateway control and the QoS rule provision message;

step S1016, the BBERF in the trusted non 3GPP access gateway2 installs the QoS rule and the event trigger, and returns the acknowledge message to the vPCRF;

step S1017, the layer 3 attachment is completed;

step S1018, the PMIPv6 tunnel is established between the trusted non 3GPP access gateway2 and the P-GW, and the UE re-establishes the first PDN connection from the source system to the default APN. The UE can access the dedicated services which have been applied in the source system through the PDN connection;

step S1019, UE sends the triggering indication message to the trusted non 3GPP access gateway2, wherein the APN and a handover indication are carried in the triggering indication message, and the handover indication is used for denoting to the trusted non 3GPP access gateway2 that one PDN connection before the handover is re-established;

step S1020, the trusted non 3GPP access gateway2 in which the BBERF resides allocates the PDN Connection Id4 for uniquely differentiating the PDN connection to be re-established. The BBERF in the trusted non 3GPP access gateway2 sends the gateway control session establishment request message, which includes the user identifier NAI, the PDN identifier APN and the PDN Connection Id4, to the vPCRF. The message makes a request for establishing one gateway control session (Gxx session), and the identifier is Gxx session 4;

step S1021, the vPCRF finds the information before the handover of the user (including the S9 session established before the handover) according to the user identifier NAI and the PDN identifier APN. However, since the PDN Connection Id4 is a new identifier, the vPCRF is unable to judge that the PDN Connection Id4 is associated with which PDN connection before the handover (namely, associated with which Subsession in the S9 session before the handover), and thus the vPCRF is unable to include information carried in the gateway control session into a certain specific Subsession to report to the hPCRF. The vPCRF sends the indication of S9 session modification message to the hPCRF to notify the hPCRF that handover occurs on the UE;

step S1022, the hPCRF is either unable to judge which PDN connection before the handover will be re-established by the UE, and thus the hPCRF is unable to send down the dedicated policy related to the specific service accessed before the handover. The hPCRF is only able to make the QoS and the event trigger according to information such as the user subscription, the network policy and the new access network bearer attribute and so on, and send these default QoS rule and event trigger down to the vPCRF through the S9 session level of the S9 session modification acknowledge message. These rules can be considered as the universal rules for the two PDN connections. Certainly, the hPCRF also may not send any rule down and only return the acknowledge message;

step S1023, if the QoS rule and event trigger are carried in the step S1022, then the vPCRF sends the default QoS rule and event trigger to the BBERF in the trusted non 3GPP access gateway2 through the gateway control establishment acknowledge message. The BBERF in the trusted non 3GPP access gateway2 installs the QoS rule and event trigger;

step S1024, the trusted non 3GPP access gateway2 sends the proxy binding update message to the P-GW, wherein the user identifier NAI, the PDN identifier APN and the PDN Connection Id4 are carried in the message, and the step S1024 can be sent just after receiving the message of step S1019 without waiting for the response of the step S1023;

step S1025, the P-GW in which the PCEF resides decides to re-establish the second PDN connection which is established in the source system for the UE after receiving the proxy binding update message, thus the PCEF sends the indication of IP-CAN session modification message (the message modifies the second IP-CAN session (Gx session2) established in the source system) to the vPCRF, wherein the PDN Connection Id4 is carried in the indication of IP-CAN session modification, and the message can further carry the user identifier NAI, the PDN identifier APN and the IP Address2;

step S1026, the vPCRF associate the gateway control session (Gxx session4) established in step S1020 with the Gx session2 and the Subsession2 of the S9 session according to the user identifier NAI, the PDN identifier APN and the PDN Connection Id3 (since the Gx session1 in the embodiment 3 is associated with the Subsession2 of the S9 session, the vPCRF associates the Gxx session4 with the Gx session2 according to the user identifier NAI, the PDN identifier APN and the PDN Connection Id3, thereby the Gxx session4 is also associated with the Subsession2). The vPCRF sends the indication of S9 session modification to the hPCRF, and includes the user identifier NAI, the PDN identifier APN, the IP address2 and the PDN Connection Id4 into the Subsession2;

step S1027, the hPCRF receives the indication of S9 session modification message, and the hPCRF may modify the PCC rule, QoS rule and event trigger (including the default rules and dedicated rules) of the second PDN connection which is established before the handover of the UE according to information such as the new access network bearer attribute and so on, and includes the PCC, QoS rules and event trigger into the Subsession2 to send to the vPCRF through the S9 session modification acknowledge message;

step S1028, the vPCRF sends the PCC rule and the event trigger to the PCEF in the P-GW through the IP-CAN session modification acknowledge message of the Gx session2, and the PCEF installs and enforces the PCC rule and the event trigger;

step S1029, the P-GW returns the proxy binding acknowledge message carrying the IP Address2 to the trusted non 3GPP access gateway2;

step S1030, the vPCRF sends the QoS rule and the event trigger to the BBERF in the trusted non 3GPP access gateway2 through the gateway control and the QoS rule provision message;

step S1031, the BBERF in the trusted non 3GPP access gateway2 installs the QoS rule and the event trigger, and returns the acknowledge message to the vPCRF;

step S1032, the trusted non 3GPP access gateway2 returns the reply message to the UE, wherein the reply message carries the IP Address2;

step S1033, the PMIPv6 tunnel is further established between the trusted non 3GPP access gateway2 and the P-GW, and the UE re-establishes the second PDN connection from the source system to the default APN. The UE can access, through the PDN connection, the dedicated services which have been applied in the source system.

In other embodiments, after the vPCRF receives the message of step S1005 or the message of step S1020, the vPCRF is unable to judge which Subsession is associated with the Gxx session3, and the vPCRF can perform no interaction with the hPCRF. Other steps are not changed.

In other embodiments, after the vPCRF receives the message of step S1020, the vPCRF knows that two PDN connections are established by the UE before the handover, and the vPCRF has known that the Gxx session3 has been associated with the Subsession1 after step S1010, at this time, there is only one Subsession2 on the vPCRF has not been associated, and thus the vPCRF can directly associate the Gxx session4 with the Subsession2 at this time.

The UE is handed over from the trusted non 3GPP access network to the 3GPP access (E-UTRAN), and at the time of the 3GPP accessing, the PMIPv6 protocol is adopted between the S-GW and the P-GW, and thus the handover flow of establishing multiple PDN connections regarding to one APN is similar to this. The difference is that, at the time of the 3GPP accessing, the MME will allocate one default bearer identifier for the default bearer of each PDN connection established by the UE, and the MME will send the identifier to the S-GW. The S-GW sends the identifier to the PCRF and the P-GW for the association between the sessions.

The flow of the handover of the UE across the S-GWs inside the 3GPP accessing is similar to this, and the difference is that the default bearer identifier allocated by the MME is used for uniquely identifying one PDN connection.

In view of the PCC, all of these handover scenarios can be unified to call as the BBERF relocation.

In order to implement the method in the above embodiments, the present invention further provides a system for performing the policy and charging control on an APN establishing PDN connections, which comprises a destination Bearer Binding and Event Report Function (BBERF), a Policy and Charging Enforcement Function (PCEF), a visited Policy and Charging Rule Function (PCRF) and a home PCRF, wherein, the destination BBERF is configured to: send a gateway control session establishment request message to the visited PCRF so as to make a request for establishing a gateway control session, wherein the Packet Data Network Connection Identifier (PDN Connection ID) is carried in the gateway control session establishment request message;

the visited PCRF is configured to: associate the gateway control session with a subsession of the S9 session associated with the Gx, session modified by an indication of Internet Protocol Connectivity Access Network (IP-CAN) session modification message according to the PDN Connection ID.

When the UE is in the roaming scenario of the home routed, the PCEF is located in the home network, and in this case, the PCEF is configured to: send the indication of IP-CAN session modification message to the home PCRF, wherein the PDN Connection ID is carried in the indication of IP-CAN session modification message; and install and enforce a Policy and Charging Control (PCC) rule sent by the home network;

the home PCRF is configured to: after receiving the indication of IP-CAN session modification message sent by the PCEF, send an S9 session and a rule provision message to the visited PCRF, and the PDN Connection ID is carried in the subsession of the S9 session associated with the Gx session modified by the indication of IP-CAN session modification message;

after modifying the PCC rule of the PDN connection which is selected to re-establish by the home Packet Data Network Gateway (P-GW) according to the new access network bearer attribute, send to the PCEF through the Gx session modified by the indication of IP-CAN session modification message; and after modifying the Quality of Service (QoS) rule of the PDN connection which is selected to re-establish by the home P-GW according to the new access network bearer attribute, send to the visited PCRF through the subsession of the S9 session;

the visited PCRF is further configured to: receive the gateway control session establishment request message sent by the destination BBERF; receive the S9 session and the rule provision message sent by the home PCRF; and receive the QoS rule sent by the home PCRF, and send the QoS rule to the destination BBERF through the gateway control session established by the gateway control session establishment request message;

the destination BBERF is further configured to: install and enforce the QoS rule sent by the visited PCRF.

When the UE is in the roaming scenario of the local breakout, the PCEF is located in the visited, and in this case, the PCEF is configured to: send the indication of LP-CAN session modification message to the visited PCRF, wherein the PDN Connection ID is carried in the indication of IP-CAN session modification message; and install and enforce a Policy and Charging Control (PCC) rule sent by the visited PCRF;

the visited PCRF is further configured to:

receive the indication of LP-CAN session modification message sent by the PCEF, and associate the gateway control session which is requested for establishing by said gateway control session establishment request message with the Gx session modified by the indication of IP-CAN session modification message according to the PDN Connection ID carried in the indication of IP-CAN session modification message;

associate the gateway control session with the subsession of the S9 session associated with the Gx session;

receive the PCC rule sent by the home PCRF, and send the PCC rule to the PCEF through the Gx session modified by the indication of IP-CAN session modification message; and receive the QoS rule sent by the home PCRF, and send the QoS rule to the destination BBERF through the gateway control session established by the gateway control session establishment request message;

the home PCRF is configured to: after modifying the PCC rule and QoS rule of the PDN connection selected by the visited P-GW according to the new access network bearer attribute, send to the visited PCRF;

the destination BBERF is further configured to: install and enforce the QoS rule sent by the visited PCRF.

Besides, in the system, the visited PCRF is further configured to: send an indication of S9 session modification message to the home PCRF so as to notify the home PCRF of the handover occurring on the user equipment; and receive the default policy sent by the home PCRF;

the home PCRF is further configured to: receive the indication of S9 session modification message sent by the visited PCRF, and send the default policy to the visited PCRF.

Obviously, the person skilled in the art should understand that, each module or step of the present invention can be implemented by using a universal computer apparatus, and they can be centralized in a single computer apparatus or distributed on a network composed of a plurality of computer apparatuses. Optionally, they can be implemented by use of the executable program code of the computer apparatus, thereby they can be stored in a storage apparatus and be enforced by the computer apparatus, or they are implemented by making into various integrated circuit modules respectively, or making a plurality of modules or steps thereinto into a single integrated circuit module. Thus, the present invention is not limited to any particular combination of the hardware and software.

The above description is only preferable embodiments of the present invention, and is not intended to limit the present invention, and various modifications and variations can be made to the present invention for the person skilled in the art. All of modifications, equivalents and/or improvements and so on made within the spirit and principle of the present invention should fall into the protection scope of the present invention.

INDUSTRIAL APPLICABILITY

In the roaming scenario, the present invention associates the gateway control session with the subsession in the S9 session associated with the Gx session modified by the indication of IP-CAN session modification message through the PDN Connection ID, thereby, after the relocation occurs on the BBERF making the modified PCC rule be sent down to the PCEF through the associated Gx session and the modified QoS be sent down to the destination BBERF through the gateway control session, thereby implementing the policy and charging control when establishing multiple PDN connections to the single APN in the roaming scenario.

What is claimed is:

1. A method for performing policy and charging control for establishing multiple packet data network (PDN) connections to a single access point name (APN), comprising:
 after at least one PDN connection with at least one corresponding subsession of a S9 session is established for said APN in a roaming scenario, when relocation occurs on a bearer binding and event report function (BBERF), a destination BBERF sending a gateway control session establishment request message to a visited policy and charging rule function (PCRF) to request establishing a gateway control session, wherein a new packet data network connection identifier (PDN Connection ID) is carried in said gateway control session establishment request message; and
 said visited PCRF, according to said new PDN Connection ID, associating the gateway control session with said subsession of said S9 session that was associated with a Gx session in the previously established PDN connection to the same APN through an indication of internet protocol connectivity access network (IP-CAN) session modification message;
 wherein in a home routed roaming scenario, a policy and charging enforcement function (PCEF) is located in a home network, and the step of said visited PCRF associating the gateway control session with said subsession of said S9 session that was associated with the Gx session in the previously established PDN connection to the same APN through the indication of IP-CAN session modification message comprises:
 the home PCEF sending the indication of IP-CAN session modification message to a home PCRF, wherein said new PDN Connection ID is carried in said indication of IP-CAN session modification message;
 said home PCRF sending an S9 session and rule provision message to said visited PCRF after receiving said indication of IP-CAN session modification message, and said new PDN Connection ID is carried in said subsession of said S9 session associated with the Gx session modified by said indication of IP-CAN session modification message; and
 said visited PCRF associating said gateway control session with said subsession of said S9 session according to said new PDN Connection ID after receiving said S9 session and rule provision message;
 or
 wherein in a local breakout roaming scenario, the PCEF is located in a visited network, the visited PCEF sends the indication of IP-CAN session modification message to said visited PCRF, and said new PDN Connection ID is carried in said indication of IP-CAN session modification message, and the step of said visited PCRF associating the gateway control session with said subsession of said S9 session that was associated with the Gx session in the previously established PDN connection to the same APN through the indication of IP-CAN session modification message comprises:
 said visited PCRF associating the gateway control session with said Gx session modified by said indication of IP-CAN session modification message according to said new PDN Connection ID; and
 said visited PCRF associating said gateway control session with said subsession of said S9 session associated with said Gx session.

2. The method as claimed in claim 1, wherein in said home routed roaming scenario, before the step of the home PCEF sending the indication of IP-CAN session modification message to the home PCRF, said method further comprises:
 a destination access gateway where said destination BBERF is located sending a proxy binding update message to a home packet data network gateway (P-GW) where the home PCEF is located, wherein said new PDN Connection ID is carried in said proxy binding update message; and
 said home P-GW selecting a PDN connection to be re-established after receiving said proxy binding update message.

3. The method as claimed in claim 2, in said home routed roaming scenario, said method further comprising:
 said home PCRF sending a policy and charging control (PCC) rule of said PDN connection which is selected to be re-established by said home P-GW to said home PCEF through the Gx session modified by said indication of IP-CAN session modification message after modifying the PCC rule according to a new access network bearer attribute, and said home PCEF installing and enforcing the modified PCC rule; and
 after said home PCRF modifies a quality of service (QoS) rule of the PDN connection which is selected to be re-established by said home P-GW according to the new access network bearer attribute, said home PCRF sending the modified QoS rule to said visited PCRF through said subsession of said S9 session, said visited PCRF sending the modified QoS rule to said destination BBERF through said gateway control session established by said gateway control session establishment request message, and said destination BBERF installing and enforcing the modified QoS rule.

4. The method as claimed in claim 2, wherein said destination access gateway is a serving gateway (S-GW) or a trusted non 3rd generation partnership project (3GPP) access gateway.

5. The method as claimed in claim 1, in said local breakout roaming scenario, before the step of said visited PCRF associating the gateway control session with said Gx session modified by the indication of IP-CAN session modification message according to said new PDN Connection ID, said method further comprising:
 a destination access gateway where said destination BBERF is located sending a proxy binding update message to a visited packet data network gateway (P-GW) where said visited PCEF is located, wherein said new PDN Connection ID is carried in said proxy binding update message; and
 said visited P-GW selecting a PDN connection to be re-established after receiving said proxy binding update message, and further said visited PCEF sending the indication of IP-CAN session modification message to said visited PCRF, wherein said new PDN Connection ID is carried in said indication of IP-CAN session modification message.

6. The method as claimed in claim 5, in said local breakout roaming scenario, the method further comprising:
    said home PCRF sending a policy and charging control (PCC) rule and a quality of service (QoS) rule of the PDN connection which is selected by said visited P-GW to said visited PCRF after modifying the PCC rule and the QoS rule according to a new access network bearer attribute;
    said visited PCRF sending said PCC rule to said visited PCEF through the Gx session modified by said indication of IP-CAN session modification message, and said visited PCEF installing and enforcing said PCC rule; and
    said visited PCRF sending said QoS rule to said destination BBERF through said gateway control session established by said gateway control session establishment request message, and said destination BBERF installing and enforcing said QoS rule.

7. The method as claimed in claim 1, after the step of said destination BBERF sending the gateway control session establishment request message to the visited PCRF, said method further comprising:
    said visited PCRF sending an indication of S9 session modification message to the home PCRF so as to notify said home PCRF of handover occurring on a user equipment, and said home PCRF sending a default policy to said visited PCRF.

8. A system for performing policy and charging control for establishing multiple packet data network (PDN) connections to a single access point name (APN), comprising: a destination access gateway which comprises a destination bearer binding and event report function (BBERF), a packet data network gateway which comprises a policy and charging enforcement function (PCEF), a visited network device which comprises a visited policy and charging rule function (PCRF), and a home network device which comprises a home PCRF; wherein:
    after at least one PDN connection with at least one corresponding subsession of a S9 session is established for said APN in a roaming scenario, when BBERF relocation occurs,
    said destination BBERF is configured to: send a gateway control session establishment request message to the visited PCRF to request establishing a gateway control session, wherein a new packet data network connection identifier (PDN Connection ID) is carried in said gateway control session establishment request message; and
    said visited PCRF is configured to: receive the gateway control session establishment request message sent by said destination BBERF, and associate the gateway control session with said subsession of said S9 session that was associated with a Gx session in the previously established PDN connection to the same APN through an indication of internet protocol connectivity access network (IP-CAN) session modification message according to said new PDN Connection ID;
    wherein, in a home routed roaming scenario, said PCEF is located in a home network,
    said PCEF is configured to: send the indication of IP-CAN session modification message to said home PCRF, wherein said new PDN Connection ID is carried in said indication of IP-CAN session modification message;
    said home PCRF is configured to: after receiving said indication of IP-CAN session modification message sent by said PCEF, send an S9 session and rule provision message to said visited PCRF, and said new PDN Connection ID is carried in said subsession of said S9 session associated with the Gx session modified by said indication of IP-CAN session modification message; and
    said visited PCRF is further configured to: receive said S9 session and rule provision message sent by said home PCRF, and associate said gateway control session with said subsession of said S9 session according to said new PDN Connection ID after receiving said S9 session and rule provision message;

or wherein, in a local breakout roaming scenario, the PCEF is located in a visited network,
    said PCEF is configured to: send the indication of IP-CAN session modification message to said visited PCRF, wherein said new PDN Connection ID is carried in said indication of IP-CAN session modification message; and
    said visited PCRF is further configured to: receive said indication of IP-CAN session modification message sent by said PCEF, and associate the gateway control session established according to said gateway control session establishment request message with said Gx session modified by the indication of IP-CAN session modification message according to said new PDN Connection ID carried in said indication of IP-CAN session modification message; and associate said gateway control session with said subsession of said S9 session associated with said Gx session.

9. The system as claimed in claim 8, wherein, in said home routed roaming scenario
    said home PCRF is further configured to:
        after modifying a policy and charging control (PCC) rule of a PDN connection which is selected to be re-established by a home packet data network gateway (P-GW) according to a new access network bearer attribute, send the modified PCC rule to said PCEF through the Gx session modified by said indication of IP-CAN session modification message; and
        after modifying a quality of service (QoS) rule of the PDN connection which is selected to be re-established by said home P-GW according to the new access network bearer attribute, send the modified QoS rule to said visited PCRF through said subsession of the S9 session;
    said PCEF is further configured to: install and enforce the PCC rule sent by said home PCRF;
    said visited PCRF is further configured to:
        receive said QoS rule sent by said home PCRF, and send said QoS rule to said destination BBERF through said gateway control session established by said gateway control session establishment request message;
    said destination BBERF is further configured to: install and enforce said QoS rule sent by said visited PCRF.

10. The system as claimed in claim 8, wherein, in said local breakout roaming scenario,
    said home PCRF is configured to:
        after modifying a policy and charging control (PCC) rule and a quality of service (QoS) rule of a PDN connection which is selected by a visited packet data network gateway (P-GW) according to a new access network bearer attribute, send the modified PCC rule and the modified QoS rule to said visited PCRF;
    said visited PCRF is further configured to:
        receive the PCC rule sent by said home PCRF, and send said PCC rule to said PCEF through said Gx session modified by said indication of IP-CAN session modification message; and receive the QoS rule sent by said home PCRF, and send said QoS rule to said destination BBERF through said gateway control session established by said gateway control session establishment request message;

said PCEF is further configured to: install and enforce the PCC rule sent by said visited PCRF;

said destination BBERF is further configured to: install and enforce said QoS rule sent by said visited PCRF.

11. The system as claimed in claim 8, wherein, said visited PCRF is further configured to:
send an indication of S9 session modification message to said home PCRF so as to notify said home PCRF of handover occurring on a user equipment; and
receive a default policy sent by said home PCRF;

said home PCRF is further configured to:
receive said indication of S9 session modification message sent by said visited PCRF, and send said default policy to said visited PCRF.

12. The method as claimed in claim 1, wherein the subsession of the S9 session is established by following steps of:
in a process of establishing an IP-CAN session, a BBERF sending a gateway control session establishment request message including a PDN Connection ID to the visited PCRF so as to establish a gateway control session;
after receiving said gateway control session establishment request message, said visited PCRF sending an indication of S9 session establishment message or an indication of S9 session modification message to the home PCRF so as to establish the subsession of the S9 session;
the PCEF sending an indication of IP-CAN session establishment message including said PDN Connection ID to said visited PCRF so as to establish the Gx session; and
said visited PCRF associating said gateway control session, said Gx session and said subsession of the S9 session according to said PDN Connection ID.

13. The method as claimed in claim 12, further comprising:
after receiving said indication of S9 session establishment message or said indication of S9 session modification message sent by said visited PCRF, said home PCRF including a default policy made for a corresponding user in an S9 session establishment acknowledge message or an S9 session modification acknowledge message to send to said visited PCRF; and
after receiving said S9 session establishment acknowledge message or said S9 session modification acknowledge message, said visited PCRF including a quality of service (QoS) rule of said default policy into a gateway control session establishment acknowledge message to send to said BBERF, and including a policy and charging control (PCC) rule of said default policy into an IP-CAN session establishment acknowledge message to send to said PCEF.

14. A network device, comprising a hardware processor which is configured with a visited policy and charging rule function (PCRF), the visited PCRF being configured to:
after at least one PDN connection with at least one corresponding subsession of a S9 session is established for a single APN in a roaming scenario, when relocation occurs on a bearer binding and event report function (BBERF),
receive a gateway control session establishment request message sent by a destination bearer binding and event report function (BBERF) for establishing a gateway control session; and
associate the gateway control session with said subsession of said S9 session that was associated with a Gx session in the previously established PDN connection to the same APN through an indication of internet protocol connectivity access network (IP-CAN) session modification message according to a new packet data network connection identifier (PDN Connection ID) carried in said gateway control session establishment request message;

wherein in a home routed roaming scenario, a policy and charging enforcement function (PCEF) is located in a home network, and said visited PCRF associates the gateway control session with said subsession of said S9 session that was associated with the Gx session in the previously established PDN connection to the same APN through the indication of IP-CAN session modification message by a following process of:
the home PCEF sending the indication of IP-CAN session modification message to a home PCRF, wherein said new PDN Connection ID is carried in said indication of IP-CAN session modification message;
said home PCRF sending an S9 session and rule provision message to said visited PCRF after receiving said indication of IP-CAN session modification message, and said new PDN Connection ID is carried in said subsession of said S9 session associated with the Gx session modified by said indication of IP-CAN session modification message; and
said visited PCRF associating said gateway control session with said subsession of said S9 session according to said new PDN Connection ID after receiving said S9 session and rule provision message;
or
wherein in a local breakout roaming scenario, the PCEF is located in a visited network, the visited PCEF sends the indication of IP-CAN session modification message to said visited PCRF, and said new PDN Connection ID is carried in said indication of IP-CAN session modification message, and said visited PCRF associates the gateway control session with said subsession of said S9 session that was associated with the Gx session in the previously established PDN connection to the same APN through the indication of IP-CAN session modification message by a following process of:
said visited PCRF associating the gateway control session with said Gx session modified by said indication of IP-CAN session modification message according to said new PDN Connection ID; and
said visited PCRF associating said gateway control session with said subsession of said S9 session associated with said Gx session.

15. The device as claimed in claim 14, wherein,
said visited PCRF is further configured to:
send an indication of S9 session modification message to the home PCRF so as to notify said home PCRF of handover occurring on a user equipment; and
receive a default policy sent by said home PCRF.

16. The device as claimed in claim 14, wherein in the process of establishing the subsession of the S9 session, the visited PCRF is configured to:
receive a gateway control session establishment request message including a PDN Connection ID sent by a BBERF for establishing a gateway control session;
after receiving said gateway control session establishment request message, send an indication of S9 session establishment message or an indication of S9 session modification message to the home PCRF so as to establish the subsession of the S9 session;

receive an indication of IP CAN session establishment message including said PDN Connection ID sent by the PCEF so as to establish the Gx session; and associate said gateway control session, said Gx session and said subsession of the S9 session according to said PDN Connection ID.

17. The device as claimed in claim 16, wherein, said visited PCRF is further configured to:

receive the S9 session establishment acknowledge message or the S9 session modification acknowledge message including a default policy made for a corresponding user sent by said home PCRF;

include a quality of service (QoS) rule of said default policy into a gateway control session establishment acknowledge message to send to said BBERF, and include a policy and charging control (PCC) rule of said default policy into an IP-CAN session establishment acknowledge message to send to said PCEF.

* * * * *